United States Patent [19]
Takeda et al.

[11] Patent Number: 6,059,065
[45] Date of Patent: May 9, 2000

[54] DRIVING TORQUE CONTROL METHOD AND APPARATUS FOR A FOUR-WHEEL DRIVE VEHICLE

[75] Inventors: Masayoshi Takeda, Kariya; Hideaki Suzuki, Anjo, both of Japan

[73] Assignee: Denso Corporation, Kariya, Japan

[21] Appl. No.: 08/906,520

[22] Filed: Aug. 5, 1997

[30] Foreign Application Priority Data

Aug. 6, 1996 [JP] Japan ................................. 8-207036
Aug. 12, 1996 [JP] Japan ................................. 8-212849

[51] Int. Cl.⁷ ................................................. B60K 17/356
[52] U.S. Cl. ........................... 180/244; 180/248; 701/69; 701/83; 701/89; 701/90
[58] Field of Search .................................. 180/244, 247, 180/248, 249; 701/69, 82, 83, 89, 90, 91

[56] References Cited

U.S. PATENT DOCUMENTS

| | | |
|---|---|---|
| 4,344,139 | 8/1982 | Miller et al. . |
| 4,589,511 | 5/1986 | Leiber ....................................... 180/244 |
| 4,753,312 | 6/1988 | Burgdorf et al. ......................... 180/244 |
| 4,967,869 | 11/1990 | Nagaoka et al. .......................... 180/244 |
| 5,004,064 | 4/1991 | Tezuka et al. . |
| 5,083,631 | 1/1992 | Nakayama et al. . |
| 5,132,908 | 7/1992 | Eto et al. .................................... 701/89 |
| 5,373,447 | 12/1994 | Howes et al. .............................. 701/83 |
| 5,497,333 | 3/1996 | Sasaki ........................................ 701/83 |
| 5,701,247 | 12/1997 | Sasaki ........................................ 701/89 |
| 5,737,714 | 4/1998 | Matsuno et al. ........................... 701/90 |
| 5,850,616 | 12/1998 | Matsuno et al. ........................... 701/89 |

FOREIGN PATENT DOCUMENTS

| | | |
|---|---|---|
| 60-248440 | 12/1985 | Japan . |
| 62-15127 | 1/1987 | Japan . |
| 62-279133 | 12/1987 | Japan . |
| 64-60429 | 3/1989 | Japan . |
| 1-95940 | 4/1989 | Japan . |
| 1-113665 | 5/1989 | Japan . |
| 1-266049 | 10/1989 | Japan . |
| 2-81719 | 3/1990 | Japan . |
| 2-81720 | 3/1990 | Japan . |
| 3-32941 | 2/1991 | Japan . |
| 4-154429 | 5/1992 | Japan . |
| 4-154430 | 5/1992 | Japan . |
| 5-319124 | 12/1993 | Japan . |
| 6-99758 | 4/1994 | Japan . |
| 7-17279 | 1/1995 | Japan . |
| 7-17280 | 1/1995 | Japan . |
| 2 291 974 | 2/1996 | United Kingdom . |

*Primary Examiner*—Daniel G. DePumpo
*Attorney, Agent, or Firm*—Pillsbury Madison & Sutro LLP

[57] ABSTRACT

A driving torque control apparatus has a first differential restraining device which restrains a rotational speed differential between front-left and front-right wheels by adjusting driving torque to be transmitted from a power source mounted on a four-wheel drive vehicle to each of the front-left and front-right wheels, and a second differential restraining device which restrains a rotational speed differential between rear-left and rear-right wheels by adjusting driving torque to be transmitted from the power source to each of the rear-left and rear-right wheels. An adjustment of driving torque by the second differential restraining device is executed in preference to an adjustment of driving torque by the first differential restraining device.

11 Claims, 12 Drawing Sheets

DRIVING TORQUE CONTROL METHOD AND APPARATUS FOR A FOUR-WHEEL DRIVE VEHICLE

CROSS REFERENCE TO RELATED APPLICATION

This application is based upon and claims the benefit of priority of the prior Japanese Patent Applications No. Hei 8-207036 filed on Aug. 6, 1996 and No. Hei 8-212849 filed on Aug. 12, 1996.

BACKGROUND OF THE INVENTION

1. Field of the Invention

The present invention relates to a driving torque control apparatus for a four-wheel drive vehicle which controls driving torque applied to each wheel of the four-wheel drive vehicle, and a driving torque control method performed therein.

2. Related Arts

Conventionally, four-wheel drive vehicles which can move on a bad condition road such as an unpaved road or a snowy road by transmitting driving torque generated by an engine to four wheels is put to practical use.

In the conventional four-wheel drive vehicle, if one of four wheels spins, driving torque can not be transmitted from the engine to the other wheels. As a result, the vehicle can not have enough tractive power to advance forward.

In other words, in the conventional four-wheel drive vehicle, driving torque from the engine is distributed to drive shafts for front and rear wheels through a center differential gear, driving torque distributed to the front wheel drive shaft is further distributed to front-left and front-right wheels through a front differential gear and driving torque distributed to the rear wheel drive shaft is further distributed to rear-left and rear-right wheels through a rear differential gear. Therefore, if any one of wheels spins, driving torque is not transmitted to the other wheel due to the action of each of the differential gears.

As a technique to solve such a problem, Japanese Patent Application Laid-Open No. (JP-A-) 60-248440 discloses an apparatus which detects a slippage of each of wheels and provides braking torque to a wheel falling in a spinning state. According to this technique, wheels are prevented from spinning, whereby driving torque is transmitted to non-spinning wheels even when one of wheels spins. That is, driving torque transmitted to the spinning wheel is reduced by applying braking torque thereto. As a result, a rotational speed differential among a plurality of wheels is restrained.

However, because the above-described apparatus merely provides braking torque to the spinning wheel (i.e., reduces driving torque thereto), running stability of the vehicle can be deteriorated.

For example, in a situation that either one of front-left and front-right wheels spins and a rotational speed differential between rear-left and rear-right wheels is being generated, if braking torque is provided to the spinning wheel (a front-left wheel or a front-right wheel), driving torque transmitted to the rear wheels is increased due to the action of the respective differential gears, with the result that the rotational speed differential between the rear-left and rear-right wheels is made larger. As a result, behavior of the vehicle is apt to over-steer, thereby deteriorating running stability of the vehicle.

Further, the above-described apparatus controls braking torque only when one of four wheels falls into a spinning state. That is, JP-A-60-248440 fails to teach driving torque control which is effective when all of four wheels simultaneously fall into the spinning state. Furthermore, because the above-described apparatus determines a spinning wheel based on a rotational speed differential between the respective wheels, if the four wheels are spinning to the same extent, the apparatus cannot detect spinning state of each of four wheels. Therefore, if the vehicle starts to travel on, for example, a slippery road having a low friction coefficient and four wheels start to spin at the same time and to the same extent, no control is performed to the spinning wheels, thereby deteriorating running stability of the vehicle.

SUMMARY OF THE INVENTION

The first object of the present invention is to obtain sufficient tractive power of a four-wheel drive vehicle without deteriorating running stability thereof.

The second object of the present invention is to ensure good stability of the vehicle even when all of four wheels spin at the same time and to the same extent.

To achieve the first object described above, the driving torque control apparatus has a first differential restraining device which restrains a rotational speed differential between front-left and front-right wheels by adjusting driving torque to be transmitted from a power source mounted on a four-wheel drive vehicle to each of the front-left and front-right wheels, and a second differential restraining device which restrains a rotational speed differential between rear-left and rear-right wheels by adjusting driving torque to be transmitted from the power source to each of the rear-left and rear-right wheels. Further, an adjustment of driving torque to be transmitted to the rear-left and rear right wheels by the second differential restraining device is executed in preference to an adjustment of driving torque to be transmitted to the front-left and front-right wheels by the first differential restraining device.

According to the driving torque control apparatus of the present invention, when the rotational speed differential between the front-left and front-right wheels becomes large, the large rotational speed differential is restrained as the result that the driving torque transmitted to each of the front-left and front-right wheels is adjusted by the first differential restraining device. Also, when the rotational speed differential between the rear-left and rear-right wheels becomes large, the rotational speed differential is restrained as the result that the driving torque transmitted to each of the rear-left and rear-right wheels is adjusted by the second differential restraining device. In addition, when the rotational speed differential occurs both between the front-left and front-right wheels and between the rear-left and rear-right wheels, the adjustment of driving torque transmitted to each of the rear-left and rear-right wheels is performed in preference to the adjustment of driving torque transmitted to each of the front-left and front-right wheels.

Therefore, when the rotational speed differential occurs both between the front-left and front-right wheels and between the rear-left and rear-right wheels, it can be reliably prevented that the behavior of the vehicle is apt to over-steer as the result that the rotational speed differential between the rear-left and rear-right wheels become large. As a result, while the running stability of the vehicle is favorably maintained, the tractive power of the vehicle can be enhanced because driving torque is sufficiently transmitted to non-spinning wheels.

To execute the adjustment of driving torque by the second differential restraining device in preference to the adjustment of driving torque by the first differential restraining device, a second starting reference value at which the second differential restraining device starts the adjustment of driving torque may be set to be smaller than a first starting reference value at which the first differential restraining device starts the adjustment of driving torque. In this case, the second differential restraining device starts the adjustment of driving torque provided to the rear-left and rear-right wheels when the rotational speed differential between the rear-left and rear-right wheels has increased up to the second starting reference value which is smaller than the first starting reference value. Therefore, the adjustment of driving torque by the second differential restraining device is performed earlier than the adjustment of driving torque by the first differential restraining device. In other words, the adjustment of driving torque by the second differential restraining device has priority over the adjustment of driving torque by the first differential restraining device.

Preferably, the driving torque control apparatus further includes a third differential restraining device which restrains a speed differential between an average rotational speed of the front-left and front-right wheels and an average rotational speed of the rear-left and rear-right wheels by adjusting driving torque transmitted to each of the front-left, front right, rear-left and rear-right wheels. In this case, the adjustment of driving torque transmitted to the rear-left and rear right wheels by the second differential restraining device is performed in preference to the adjustment of driving torque by the first differential restraining device or the third differential restraining device.

Therefore, when rotational speed differentials are generated among the respective four wheels, the rotational speed differential between the rear-left and rear-right wheels are restrained in preference to the other rotational speed differentials. Therefore, the tractive power of the vehicle is reliably enhanced without deteriorating the running stability of the vehicle.

A differential amount of each of the front-left and front-right wheels, which represents a rotational speed differential relative to the other wheels, can be obtained by adding the rotational speed differential between the front-left and front-right wheels and the rotational speed differential between the average speed of the front wheels and the average speed of the rear wheels. That is, the differential amount of each of the front-left and front-right wheels is derived from the following equations (1) and (2).

$$\Delta VFL = VWFL - VWFR + \left(\frac{VWFL + VWFR}{2} - \frac{VWRL + VWRR}{2}\right) \quad (1)$$

$$\Delta VFR = VWFR - VWFL + \left(\frac{VWFL + VWFR}{2} - \frac{VWRL + VWRR}{2}\right) \quad (2)$$

where $\Delta VFL$ represents the differential amount of the front-left wheel, $\Delta VFR$ represents the differential amount of the front-right wheel, and VWFL, VWFR, VWRL and VWRR represent front-left wheel speed, front-right wheel speed, rear-left wheel speed and rear-right wheel speed, respectively.

Also, differential amount of each of the rear-left and rear-right wheels is derived from the following equations (3) and (4).

$$\Delta VRL = VWRL - VWRR + \left(\frac{VWRL + VWRR}{2} - \frac{VWFL + VWFR}{2}\right) \quad (3)$$

$$\Delta VRR = VWRR - VWRL + \left(\frac{VWRL + VWRR}{2} - \frac{VWFL + VWFR}{2}\right) \quad (4)$$

When the adjustment of driving torque transmitted to each of four wheels is performed based on the differential amounts thus obtained, not only the rotational speed differential between the front-left and front-right wheels or between the rear-left and rear-right wheels but also the rotational speed differential between the average speed of the front wheels and the average speed of the rear wheels can be simultaneously restrained. Further, a second reference value to be compared with the differential amounts $\Delta VRL$, $\Delta VRR$ of the rear wheels is set to be smaller than a first reference value to be compared with the differential amounts $\Delta VFL$, $\Delta VFR$ of the front wheels. Therefore, the rotational speed differential between the rear-left and rear-right wheels is restrained in preference to the rotational speed differential between the front-left and front-right wheels. As a result, the tractive power of the vehicle is reliably enhanced without deteriorating the running stability of the vehicle To achieve the second object described above, the driving torque control apparatus has a determining device for determining whether all of four wheels fall into a spinning state. If the determining device determines that all of the four wheels do not fall into the spinning state, that is, if the three wheels or less are spinning, a rotational speed differential between a spinning wheel and a non-spinning wheel (or non-spinning wheels) is restrained by a differential restraining device. On the other hand, if the determining device determines that all of the four wheels fall into the spinning state, braking torque is provided only to the rear wheels to make smaller spinning states of the rear wheels, that is, to reduce the rotational speeds of the rear wheels. As a result, the grips of the rear wheels on a road are increased, with the result that the side forces (lateral resistant forces) of the rear wheels are increased. Therefore, the stability of the vehicle to run straight is enhanced. In the meantime, when the vehicle is in a turning state, a yawing moment to relieve the over-steering tendency of the vehicle is generated, thereby reliably avoiding the vehicle spinning.

The determining device can determine that all of four wheels fall into a spinning state when the vehicle is accelerated and an acceleration of a wheel having a minimum wheel speed is larger than a value obtained by adding an acceleration of a vehicle body and a predetermined value. That is, in the above-described situation, because the wheel having the minimum wheel speed is considered to be spinning, it is conceivable that all of four wheels are spinning.

Alternatively, the determining device can determine that all of four wheels fall into a spinning state when the vehicle is accelerated, and the rear-left and rear-right wheel are provided with braking torque to restrain spinning state of the rear wheels. In this case, all of four wheels are not really spinning. However, if brake torque is provided to the rear-left and rear-light wheels, because driving power transmitted to the front-left and front-right wheels is increased due to the actions of the differential gears, there arises strong possibility that the front-left and front-right wheels will spin. In addition, because the rear-left and rear-light wheels are spinning, it is conceivable that the road on which the vehicle is running has a low friction coefficient with respect to left-hand and right-hand wheels. Such a situation that braking torque is provided to the rear-left and rear-right wheels can be considered as a situation moving toward a situation that all of four wheels fall into a spinning state. Therefore, the above-described situation can be regarded as equal to the situation that all of four wheels fall into a spinning state.

BRIEF DESCRIPTION OF THE DRAWINGS

These and other objects, features and characteristics of the present invention will be appreciated from a study of the following detailed description, the appended claims, and drawings, all of which form a part of this application. In the drawings:

DETAILED DESCRIPTION OF THE PREFERRED EMBODIMENTS (First Embodiment)

A first embodiment according to the present invention will be described hereinafter with reference to the drawings.

Figure 1:
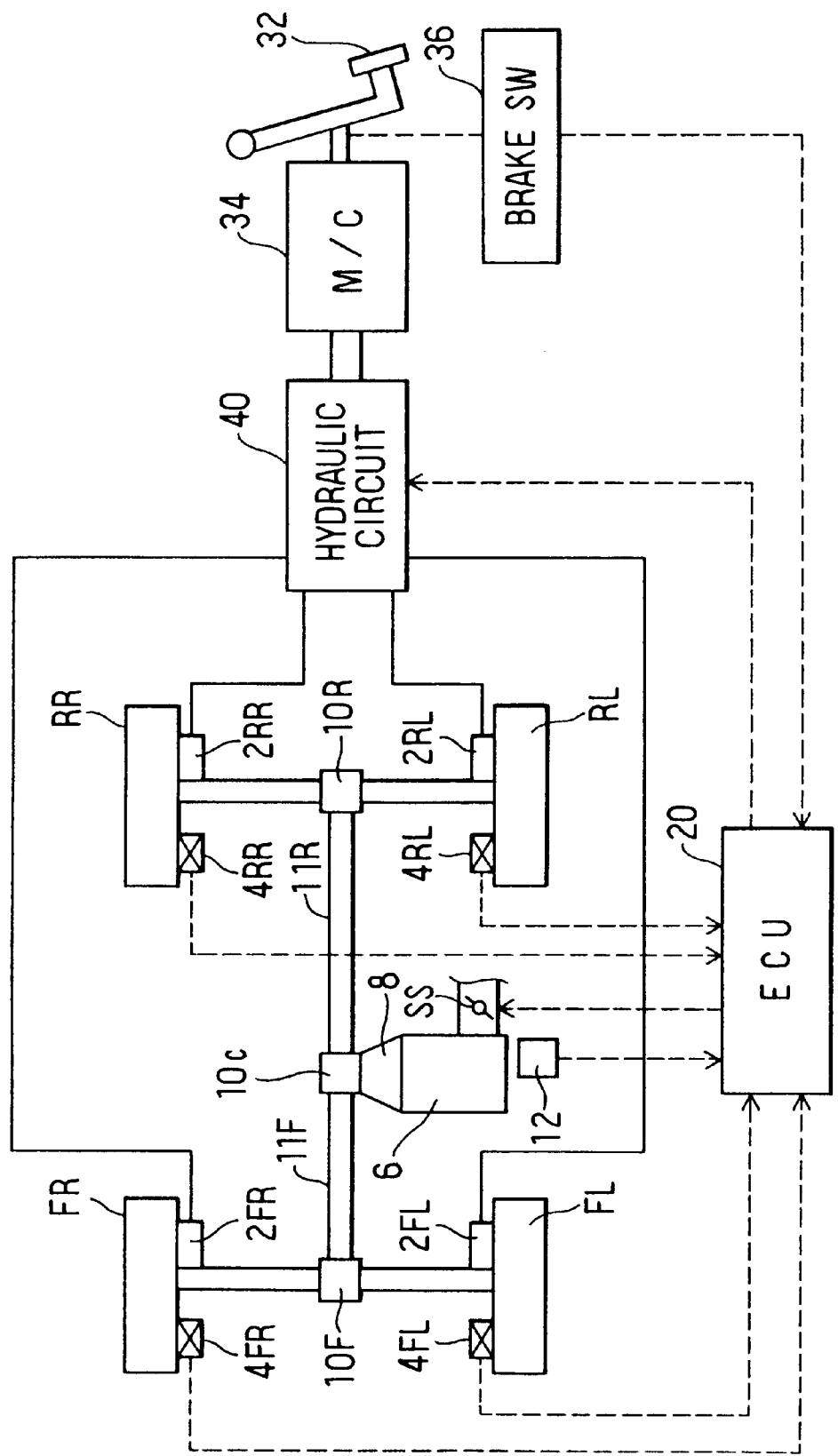
FIG. 1 is a model diagram illustrating a structure of a control system for a four-wheel drive vehicle according to a first embodiment of the present invention.

FIG. 1 is a model diagram illustrating a structure of a control system for a four-wheel drive vehicle according to a first embodiment of the present invention.

In FIG. 1, brake devices of hydraulic pressure type (hereinafter, referred to as "wheel cylinder: W/C") 2FL, 2FR, 2RL and 2RR to provide braking torque to each of wheels (front-left wheel FL, front-right wheel FR, rear-left wheel RL and rear-right wheel RR) are installed corresponding to the four wheels FL, FR, RL and RR of a vehicle. In addition, wheel speed sensors 4FL, 4FR, 4RL and 4RR are also installed to detect rotational speed (which is called as "wheel speed") of each of four wheels FL, FR, RL and RR.

Driving torque generated from an engine 6 through a transmission 8 is distributed to a front wheel drive shaft 11F and a rear wheel drive shaft 11R through a center differential gear 10C. Further, driving torque distributed to the front wheel drive shaft 11F is distributed to front-left and front-right wheels FL, FR through a front differential gear 10F and driving torque distributed to the rear wheel drive shaft 10R is distributed to rear-left and rear-right wheels RL, RR through a rear differential gear 10R.

On the engine 6, a group of sensors 12 to detect an operating state of the engine 6 such as its rotational speed, intake air quantity, coolant temperature, and an opening degree of a throttle valve. Detection signals from the group of sensors 12 and from the wheel speed sensors 4FL~4RR are fed to an electronic control unit (ECU) 20.

The ECU 20 controls an injected fuel quantity and an ignition timing of the engine 6 based on the detection signals from the group of sensors 12. In addition, the ECU 20 performs antiskid control (hereinafter, referred to as "ABS control") by which wheel slippage generated during vehicle; braking is restrained and differential restraining control (hereinafter, referred to as "driving torque control) by which rotational speed differentials among the respective wheels FL~RR are restrained, by controlling various kinds of actuators within a hydraulic circuit 40 which are disposed in hydraulic conduits reaching from a master cylinder (hereinafter, "M/C") 34 which generates brake-fluid pressure in response to a depression of a brake pedal 32 to wheel cylinders (W/Cs) 2FL~2RR of the respective wheels FL~RR.

The ECU 20 is structured mainly from a micro computer provided with a CPU, a ROM, and a RAM. A detection signal from a brake switch 36 which becomes "ON" state during an operation of the brake pedal 32 is also fed to the ECU 20.

In an intake system of the engine 6, a sub-throttle valve SS is provided in addition to a throttle valve (not illustrated) of which opening degree is adjusted in response to an operation of accelerator by a driver. The ECU 20 controls the opening degree of the sub-throttle valve SS based on a driving condition of the vehicle.

Next, the hydraulic circuit 40 will be described.

Figure 2:
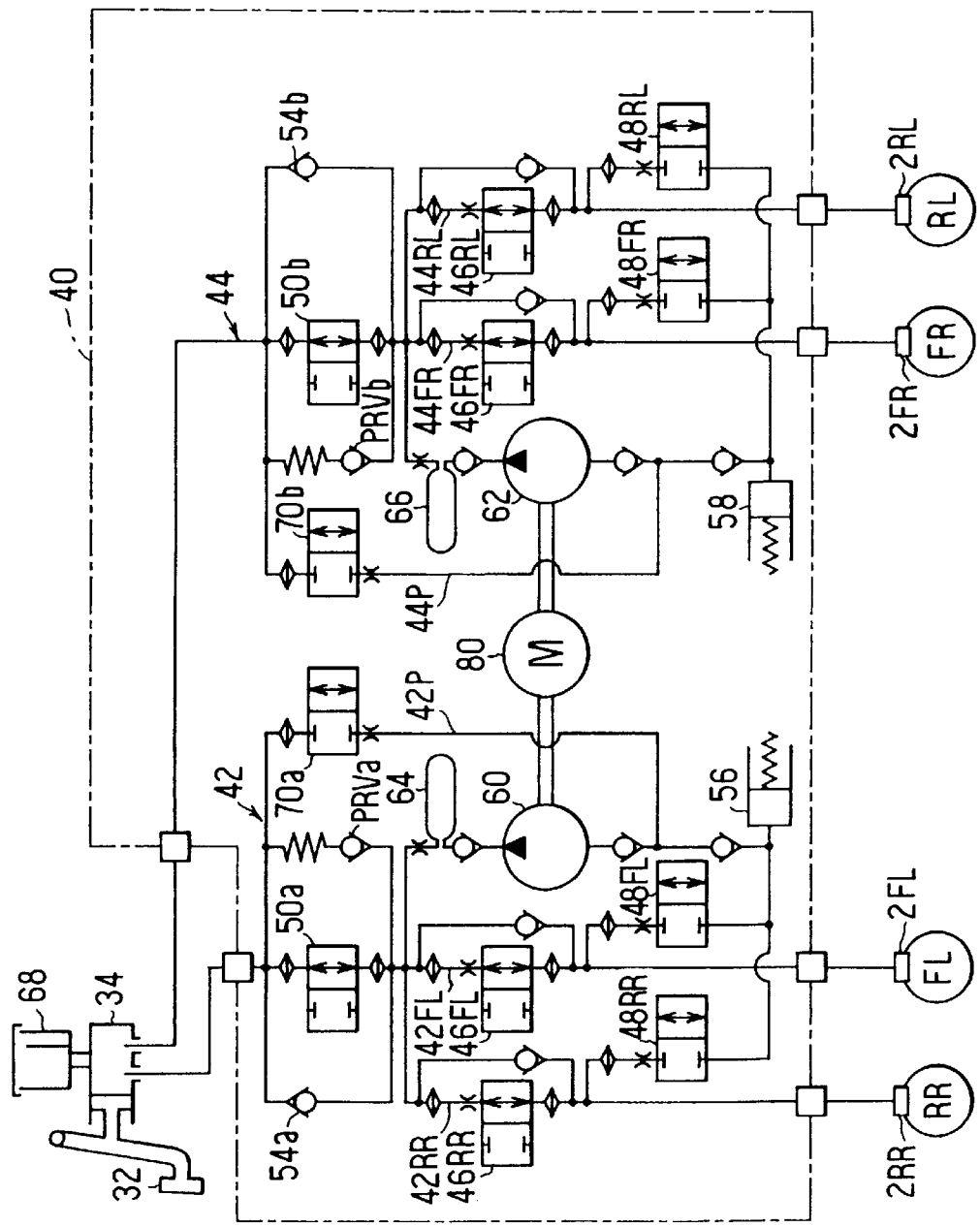
FIG. 2 is a drawing illustrating a configuration of a hydraulic circuit in the first embodiment.

As shown in FIG. 2, the hydraulic circuit 40 includes two hydraulic systems 42 and 44 which supply brake fluid pressurized and discharged from two discharge ports of the M/C 34 to front-left and rear-right wheels FL and RR and to front-right and rear-left wheels FR and RL, respectively.

In the hydraulic system 42, pressure-increasing control valves 46FL and 46RR of electromagnetic type are provided in a conduit 42FL reaching to the W/C 2FL of the front-left wheel FL and in a conduit 42RR reaching to the W/C 2RR of the rear-right wheel RR, respectively. The pressure-increasing control valves 46FL and 46RR can be switched between a pressure-increasing position in which the conduits 42FL and 42RR are communicated and a maintaining position in which the conduit 42FL and 42RR are interrupted. Further, In the hydraulic system 42, pressure-reducing control valves 48FL and 48RR of electromagnetic type are provided in the conduit 42FL and the conduit 42RR, respectively. The pressure-reducing control valves 48FL and 48RR controls discharge of brake fluid in the W/Cs 2FL and 2RR to a reservoir 56.

In the same way, in the hydraulic system 44, pressure-increasing control valves 46FR and 46RL of electromagnetic type are provided in a conduit 44FR reaching to the W/C 2FR of the front-right wheel FR and in a conduit 44RL reaching to the W/C 2RL of the rear-right wheel RL, respectively. The pressure-increasing control valves 46FR and 46RL can be switched between a pressure-increasing position in which the conduits 44FR and 44RL are communicated and a maintaining position in which the conduit 44FR and 44RL are interrupted. Further, pressure-reducing control valves 48FR and 48RL of electromagnetic type are provided in the conduit 44FR and the conduit 44RL, respectively. The pressure-reducing control valves 48FR and 48RL controls discharge of brake fluid in the W/Cs 2FR and 2RL to a reservoir 58.

The pressure-increasing control valves 46FL, 46FR, 46RL, and 46RR normally assume the pressure increasing position and are switched to the maintaining position in response to current provided from the ECU 20. The pressure-reducing control valves 48FL, 48FR, 48RL, and 48RR normally assume an interrupted state and are switched to a communicated state in response to current provided from the ECU 20, whereby brake fluid in the corresponding W/Cs 2FL~2RR is discharged to the reservoir 56 or 58.

Additionally, a master-cylinder cut-off valve (hereinafter, "SM valve") 50a is provided on the M/C 34 side of the pressure-increasing control valves 46FL and 46RR in the hydraulic system 42. A relief valve 54a which allows brake fluid to escape from the M/C 34 to the pressure-increasing control valves 46FL and 46RR when brake-fluid pressure on the M/C 34 side is higher than that on the pressure-increasing control valves 46FL and 46RR side is connected in parallel with the SM valve 50a.

Further, a SM valve 50b is provided on the M/C 34 side of the pressure-increasing control valves 46FR and 46RL in the hydraulic system 44. A relief valve 54b which allows brake fluid to escape from the M/C 34 to the pressure-increasing control valves 46FR and 46RL when brake-fluid pressure on the M/C 34 side is higher than that on the pressure-increasing control valves 46FR and 46RL side is connected in parallel with the SM valve 50b.

It should be noted that the SM valves 50a and 50b normally assume a communicated state and are switched to an interrupted state in response to current provided from the ECU 20.

Differential pressure regulating valves PRVa and PRVb are connected in parallel with the SM valves 50a and 50b, respectively. The differential pressure regulating valves PRVa and PRVb prevent brake fluid from flowing from the M/C 34 to the W/Cs side and allow the brake fluid to flow from the W/Cs side to the M/C 34 when brake-fluid pressure on the W/Cs side is higher by a predetermined pressure than that on the M/C 34 side. As this predetermined pressure, pressure of 50 atm~200 atm is acceptable. That is to say, each of the differential pressure regulating valves PRVa and PRVb protects the conduit on the M/C 34 side of the SM valves 50a and 50b by preventing brake-fluid pressure therein from rising beyond a predetermined value.

In FIG. 2, the conduit was provided in parallel to each of the SM valves 50a and 50b, and the differential pressure regulating valves PRVa and PRVb are disposed in the conduits, respectively. Substituting for this structure, each of the SM valves 50a and 50b can have a differential pressure regulating valve, which relieves brake fluid at a predetermined relief pressure, at its interrupted position, that is, the above-described differential pressure regulating valves PRVa and PRVb may be built in each of the SM valves 50a and 50b.

Additionally, in the hydraulic systems 42 and 44, reservoirs 56 and 58 which temporally accumulate brake fluid discharged through the pressure-reducing control valves 48FL~48RR are provided, and pumps 60 and 62 to send out brake fluid accumulated in the reservoirs 56 and 58 to the conduit between the SM valve 50a and the pressure-increasing control valves 46FL and 46RR and to the conduit between the SM valve 50b and the pressure-increasing control valves 46FR and 46RL are provided. Further, accumulators 64 and 66 to lessen pulsation of hydraulic pressure are disposed in discharging paths of the respective pumps 60 and 62.

Further in the hydraulic systems 42 and 44, there are provided brake-fluid supplying paths 42P and 44P to directly supply brake fluid from a reservoir 68 mounted on an upper portion of the M/C 34 to the pumps 60 and 62 through the M/C 34 during performance of driving torque control which will be described later. In these brake-fluid supplying paths 42P and 44P, reservoir cut-off valves (hereinafter "SR valve") 70a and 70b are provided to communicate or interrupt the corresponding brake-fluid supplying paths 42P and 44P.

The SR valves 70a and 70b normally assume the interrupted state and are switched to the communicated state in response to current provided from the ECU 20. Each of pumps 60 and 62 are driven through a motor 80 during performance of ABS control and driving torque control.

Next, ABS control and driving torque control performed by the ECU 20 will be described.

When ABS control and driving torque control are not performed, all of the electromagnetic valves in the hydraulic circuit 40 are switched "OFF", FIG. 2 illustrates non-control state in which all of the electromagnetic valves are switched "OFF". In more detail, the SM valves 50a and 50b assume the communicated position, the SR valves 70a and 70b assume the interrupted position, the pressure-increasing control valves 46FL~46RR assume the communicated position, and the pressure-reducing control valves 48FL~48RR assume the interrupted position.

Figure 3:
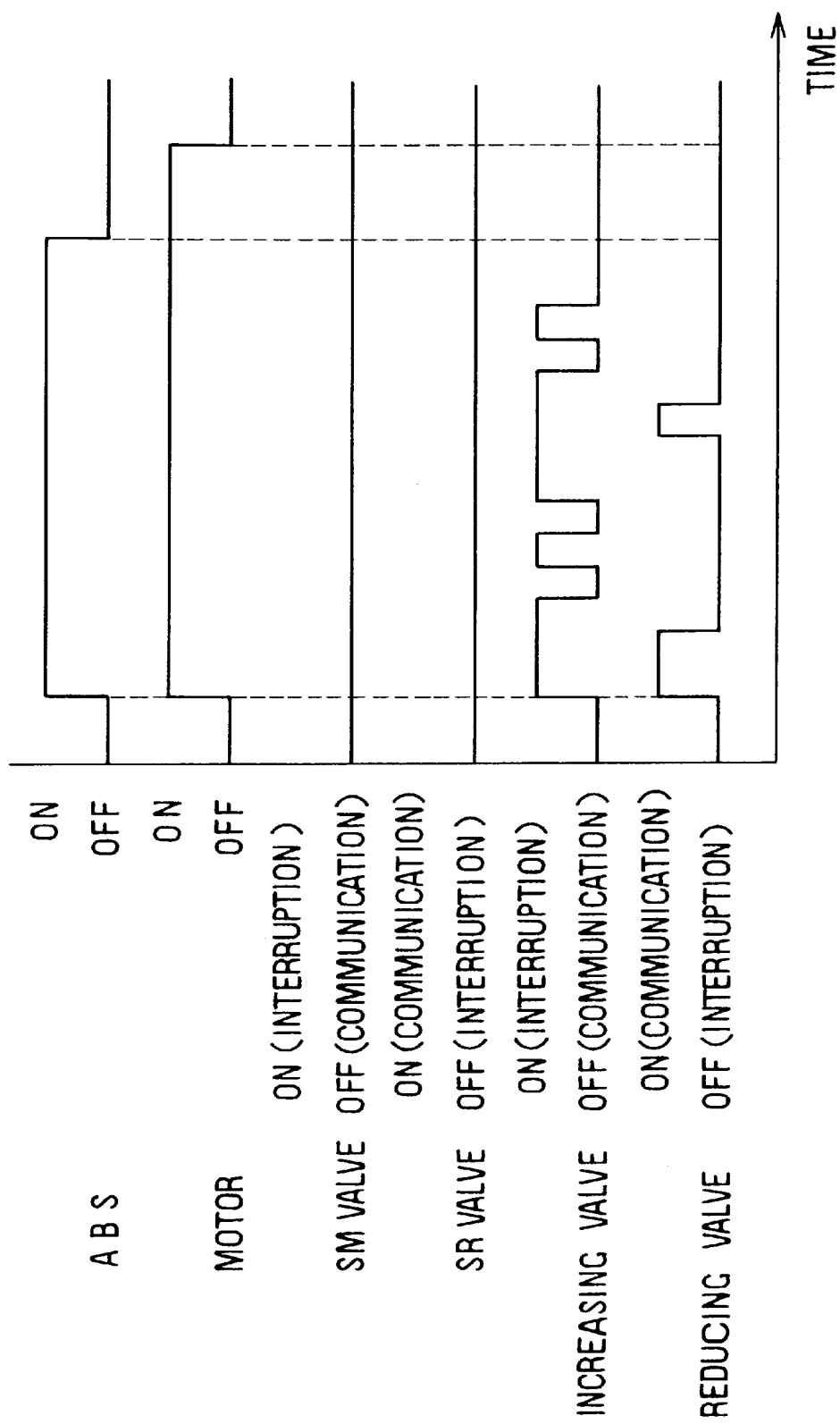
FIG. 3 is a time chart to explain anti-lock brake control performed by an electric control unit (ECU)

ABS Controls when wheel slippage at each of wheels FL~RR occurs, for example, by a rapid operation of the brake pedal 32 by a driver, as shown in FIG. 3, ABS control starts. In ABS control, while the SM valves 50a and 50b are maintained to the communicated position ("OFF" state) and the SR valves 70a and 70b are maintained to the interrupted position ("OFF" state), the pumps 60 and 62 are actuated by driving the motor 80, and further, brake fluid pressure within the respective W/Cs 2FL~2RR is switched to a pressure-increasing state, a pressure-holding state or a pressure-reducing state in response to the slipping states of the respective wheels FL~RR by switching on or off the pressure-increasing control valves 46FL~46RR and the pressure-reducing control valves 48FL~48 RR.

In more detail, when a wheel is determined to has a locking tendency, brake fluid pressure within a W/C (2FL~2RR) corresponding to the wheel is reduced to prevent occurrence of wheel locking by switching the pressure-increasing control valve (46FL~46RR) corresponding to the wheel to the interrupted position ("ON" state) and switching the pressure-reducing control valve (48FL~48RR) corresponding thereto to the communicated position ("ON" state). At this time, brake fluid discharged from the W/C (2FL~2RR) as a result of pressure-reducing control flows to a reservoir (56 and 58) via the pressure-reducing control valve (48FL~48RR). Brake fluid accumulated in the reservoir (56 and 58) is returned to a normal brake-fluid path by driving the pump 80.

Accordingly, when ABS control is in progress, if the locking tendency of the wheel is determined to be cancelled, brake fluid pressure within a W/C (2FL~2RR) corresponding to the wheel is increased by switching the pressure-increasing control valve (46FL~46RR) corresponding to the wheel to the communicated position ("OFF" state) and switching the pressure-reducing control valve (48FL~48RR) corresponding thereto to the interrupted position ("OFF" state). It should be noted that, because the locking tendency of the wheel is strengthened if W/C brake-fluid pressure is rapidly increased, a state of maintaining W/C brake-fluid pressure is interposed in pressure-increasing control by causing both the pressure-increasing control valve (46FL~46FR) and the pressure-reducing control valve (48FL~48RR) to be in the interrupted state (that is, the pressure-increasing control valve="ON" state, and the pressure-reducing control valve="OFF" state). According to this control, W/C brake-fluid pressure is gradually increased, thereby preventing the wheel from locking and assuring the stability of the vehicle.

After ABS control is terminated, the motor 80 is driven for a predetermined time to evacuate brake fluid in the reservoir (56 and 58), whereby the following ABS control can be favorably performed.

Driving Torque Control (Differential Restraining Control)

Driving torque control is performed to detect rotational speed differentials among the respective wheels FL~RR and to restrain the rotational speed differentials when a driver operates the accelerator to drive the vehicle (that is, the driver does not operate a brake pedal), because, if any one of the wheels FL~RR spins in a four-wheel drive vehicle, driving torque is not transmitted to the other wheels by the actions of the respective differential gears 10C, 10F, and 10R as was stated in the "Related Arts".

In driving torque control, first, the pumps 60 and 62 are actuated by driving the motor 80, and the SM valves 50a and 50b and the SR valves 70a and 70b are switched "ON". That is to say, the SM valves 50a and 50b are driven to the interrupted position and the SR valves 70a and 70b are driven to the communicated position. Due to this, a state that brake fluid is capable of being sent out from the reservoir 68 mounted on the upper portion of the M/C 34 to the respective pressure-increasing control valves 46FL~46RR by the pumps 60 and 62 can be obtained.

Further, in driving torque control, suitable braking torque is applied to each of the wheels FL~RR so that the rotational speed differentials among the wheels FL~RR are restrained by switching on or off the pressure-increasing control valves 46FL~46RR and the pressure-reducing control valves 48FL~48RR in response to the rotational speed differentials among the wheels FL~RR.

In more detail, in the same manner as ABS control, W/C brake-fluid pressure of each of the wheels FL~RR is switched to a pressure-increasing state, a pressure-holding state, or a pressure-reducing state, whereby braking torque of each of wheels FL~RR is changed and so driving torque transmitted to each of wheels FL~RR is regulated.

A driving torque control processing performed in the ECU 20 to execute driving torque control will be described hereinafter with reference to a flow-chart illustrated in FIG. 5. Note that the driving torque control processing is periodically performed at every predetermined interval after an ignition switch (not illustrated) is turned on. Further, in the description hereinafter, the numerals or signs accompanying "FL", "FR", "RL", and "RR" represent parts or the like provided for a specific wheel among the respective wheels FL~RR. For example, a wheel speed VWFL represents a wheel speed of the front-left wheel FL.

Figure 5:
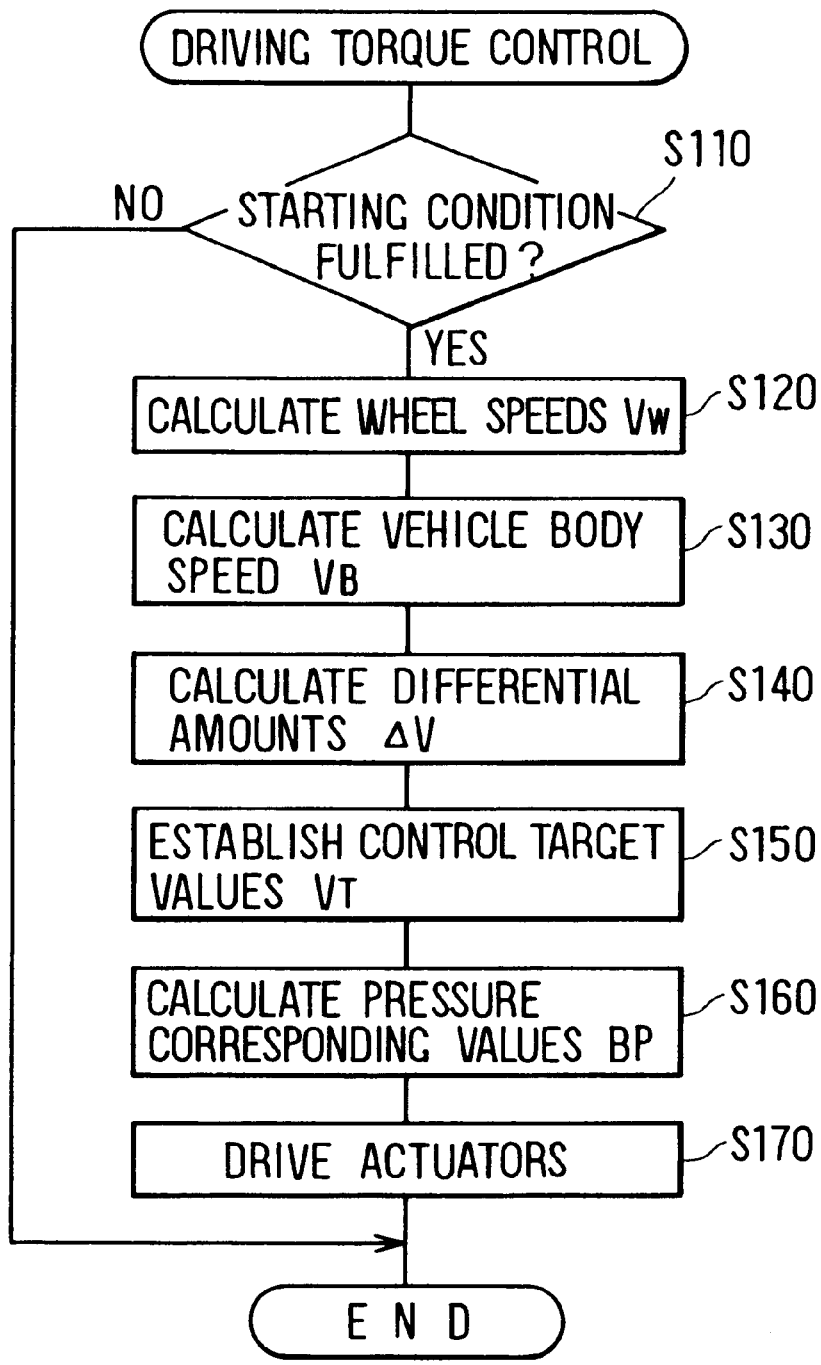
FIG. 5 is a flow chart illustrating steps processed by the ECU to perform driving torque control.

As shown in FIG. 5, when the driving torque control processing is started, first, at step 110, it is determined whether a starting condition for starting driving torque control is fulfilled. When the starting condition for driving torque control is not fulfilled, the driving torque control processing is terminated for the time being; when the starting condition is determined to be fulfilled, the processing advances to step 120. For example, the starting condition is fulfilled when the brake switch 36 is not switched on and a driver depresses the accelerator.

At step 120, wheel speeds VWFL~VWRR of the respective wheels FL~RR are calculated based on detection signals from the respective wheel speed sensors 4FL~4RR. At the following step 130, a vehicle-body speed VB of the vehicle is calculated based on the wheel speeds VWFL~VWRR derived in step 120. This calculation is performed according to a well-known method such that it is determined whether a minimum speed VWmin among the wheel speeds VWFL~VWRR of the respective wheels FL~RR is in a range from an acceleration limit value $V\alpha$ obtained by adding the previous vehicle-body speed VB(n-1) and a predetermined value to a deceleration limit value $V\beta$ obtained by subtracting a predetermined value from the previous vehicle-body speed VB(n-1); when the minimum speed VWmin is in the range from the acceleration limit value $V\alpha$ to the deceleration limit value $V\beta$, the minimum speed VWmin is set as the vehicle-body speed VB as it was; when the minimum speed VWmin exceeds the acceleration limit value $V\alpha$, the acceleration limit value $V\alpha$ is set as the vehicle-body speed VB; and when the minimum speed VWmin lowers below the deceleration limit value $V\beta$, the deceleration limit value $V\beta$ is set as the vehicle-body speed VB.

After the vehicle-body speed VB is derived in this way, the processing advances to step 140. At step 140, the differential amounts $\Delta$VFL~$\Delta$VRR of the respective wheels FR~RR are calculated based on the wheel speeds VWFL~VWRR calculated in step 120 by using the equations (1)~(4).

In more detail, the differential amount $\Delta$VFL of the front-left wheel FL is calculated, as shown in the equation (1), by adding a difference (VWFL−VWFR) between the wheel speed VWFL of the front-left wheel FL and the wheel speed VWFR of the front-right wheel VWFR to a front-rear wheel speed difference [(VWFL+VWFR)/2−(VWRL+VWRR)/2] which is a difference between an average speed of the wheel speeds VWFL and VWFR of the front-left and -right wheels FL and FR and an average speed of the wheel speeds VWRL and VWRR of the rear-left and -right wheels RL and RR.

The differential amount $\Delta$VFR of the front-right wheel FR is calculated, as shown in the equation (2), by adding a difference (VWFR−VWFL) between the wheel speed VWFR of the front-right wheel FR and the wheel speed VWFL of the front-left wheel VWFL to the above-described front-rear wheel speed difference [(VWFL+VWFR)/2−(VWRL+VWRR)/2].

In the meantime, the differential amount $\Delta$VRL of the rear-left wheel RL is calculated, as shown in the equation (3), by adding a difference (VWRL−VWRR) between the wheel speed VWRL of the rear-left wheel RL and the wheel speed VWRR of the rear-right wheel VWRR to a rear-front wheel speed difference [(VWRL+VWRR)/2−(VWFL+VWFR)/2] which is a difference between an average speed of the wheel speeds VWRL and VWRR of the rear-left and -right wheels RL and RR and an average speed of the wheel speeds VWFL and VWFR of the front-left and -right wheels FL and FR.

The differential amount ΔVRR of the rear-right wheel RR is calculated, as shown in the equation (4), by adding a difference (VWRR−VWRL) between the wheel speed VWRR of the rear-right wheel RR and the wheel speed VWRL of the rear-left wheel VWRL to the rear-front wheel speed difference [(VWRL+VWRR)/2−(VWFL+VWFR)/2].

That is to say, each of the differential amounts ΔVFL~ΔVRR represents how high the wheel speed VW of the corresponding wheel is relative to the wheel speed VW of the other wheels.

Figure 6:
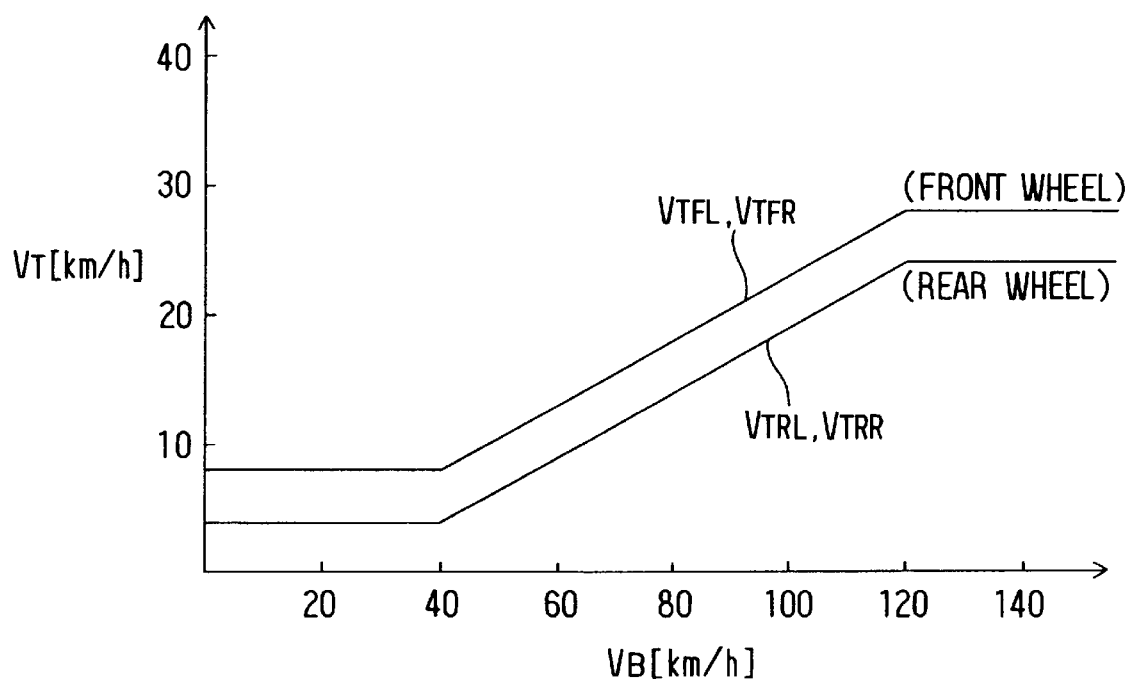
FIG. 6 is a graph illustrating data utilizing for driving torque control.

After the differential amounts ΔVFR~ΔVRR of the respective wheels FL~RR are thus calculated in step 140, at subsequent step 150, control target values VTFL~VTRR for the differential amounts ΔVFR~ΔVRR of the respective wheels FL~RR are established with use of a data map illustrated in FIG. 6, on the basis of the vehicle-body speed VB obtained in step 130.

The control target values VTFL~VTRR are used to limit the differential amounts ΔVFR~ΔVRR of the respective wheels FL~RR to the corresponding control target value VTFL~VTRR. In other words, if the differential amounts ΔVFR~ΔVRR of the respective wheels FL~RR excess the corresponding control target value VTFL~VTRR, the W/C pressure of the corresponding wheel is increased, as described later, and as a result, the differential amounts ΔVFR~ΔVRR of the respective wheels FL~RR are controlled below the corresponding control target value VTFL~VTRR.

As shown in FIG. 6, the control target values VTFL~VTRR are established to be the larger values for the higher speed of the vehicle-body speed VB. Specifically, the control target values VTRL, VTRR for the rear-left and -right wheels are established to be smaller than the control target values VTFL, VTFR for the front-left and -right wheels. As a result, even when the differential amounts ΔVRL, ΔVRR of the rear wheels RL, RR are smaller than those of the front wheels FL, FR, pressure-increase of the W/C pressure (i.e., decrease of driving torque) is performed with respect to the rear wheels RL, RR. In the present embodiment, the control target values VTRL, VTRR for the rear-left and -right wheels RL, RR are set to be equal to each other, and the control target values VTFL, VTFR for the front-left and -right wheels FL, FR are set to be equal to each other, too.

After the control target values VTFL~VTRR for the respective wheels FL~RR are thus established, the processing advances to step 160, at which brake-fluid pressure corresponding values BPFL~BPRR which correspond to brake fluid pressures in the respective W/Cs 2FL~2RR of the wheels FL~RR are calculated by the following equations (5)~(8) making use of the differential amounts ΔVFL~ΔVRR obtained in step 140 and the control target values VTFL~VTRR obtained in step 150. That is to say, the brake-fluid pressure corresponding values BPFL~BPRR are calculated, as shown in the equations (5)~(8), by multiplying a difference [ΔV−VT] of the differential amount ΔV and the control target value VT by a predetermined constant value α with respect to each of the respective wheels FL~RR.

$$BPFL = \alpha \times (\Delta VFL - VTFL) \quad (5)$$

$$BPFR = \alpha \times (\Delta VFR - VTFR) \quad (6)$$

$$BPRL = \alpha \times (\Delta VRL - VTRL) \quad (7)$$

$$BPFL = \alpha \times (\Delta VRR - VTRR) \quad (8)$$

Figure 4:
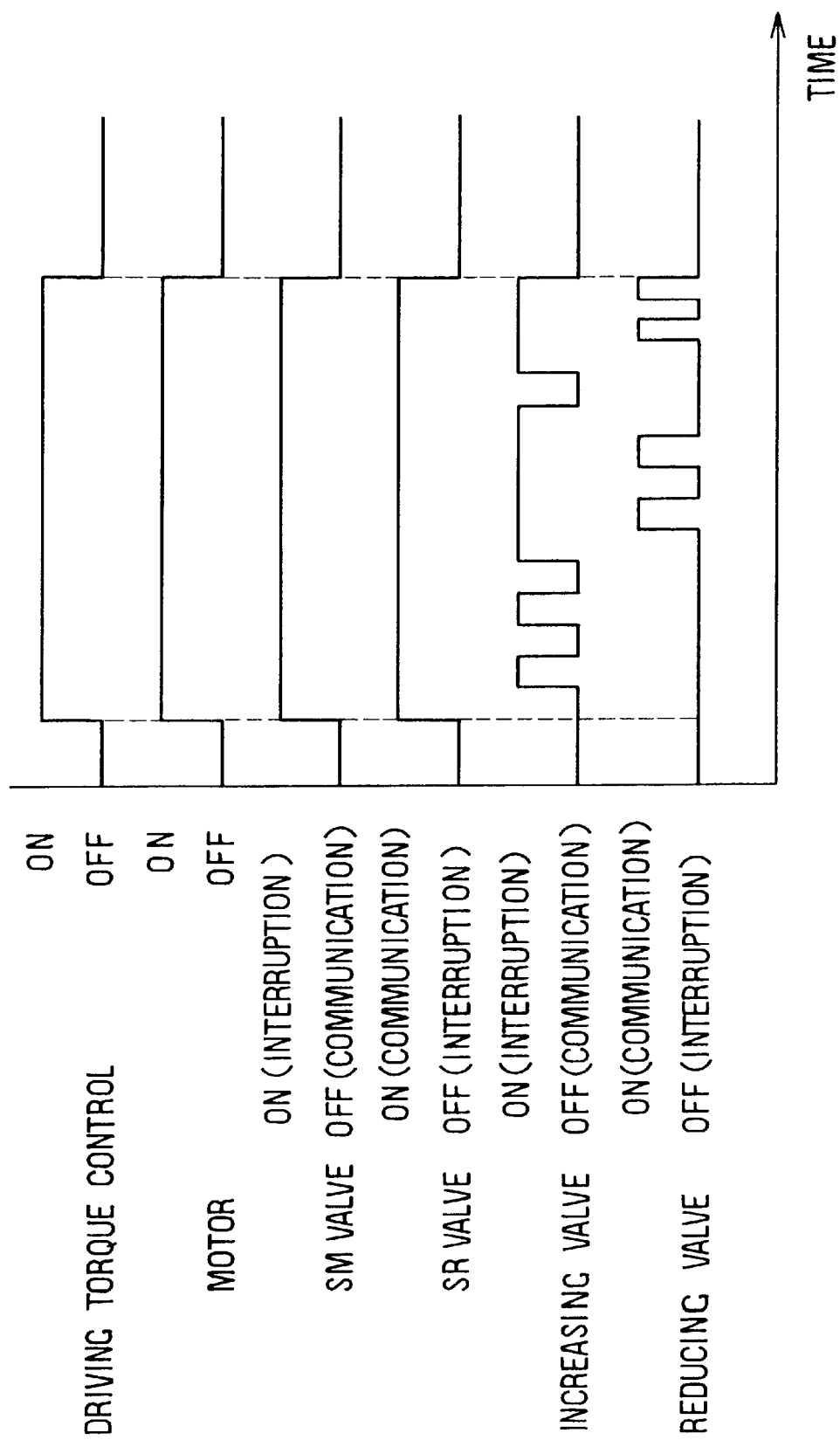
FIG. 4 is a time chart to explain driving torque control performed by the ECU.

At subsequent step 170, the pumps 60, 62 are operated by driving the motor 80, as described with reference to FIG. 4. At the same time, the SM valves 50a, 50b and the SR valves 70a, 70b are turned on so that the SM valves 50a, 50b assume the interupted positions and the SR valves 70a, 70b assume the communicated positions. Additionally, in step 170, the pressure-increasing control valves 46FL~46RR and the pressure-reducing control valves 48FL~48RR are controlled in response to the brake-fluid pressure corresponding values BPFL~BPRR so that the W/C pressures for the respective wheels FL~RR are adequately switched to one of a pressure-increasing state, pressure-reducing state, and pressure-holding state. As a result, driving torque to be transmitted to the respective wheels FL~RR is separately regulated so that the differential amounts ΔVFL~ΔVRR of the respective wheels FL~RR are controlled below the control target values VTFL~VTRR.

In more detail, if the differential amount ΔV of any of the wheels rises to the control target value VT or more, and the brake-fluid pressure corresponding value BP calculated in step 160 becomes a positive value, the pressure-increasing control valve 46 and the pressure-reducing control valve 48 corresponding to the wheel are controlled so that the W/C pressure of the wheel becomes larger for larger positive value of the brake-fluid pressure corresponding value BP (i.e., the more greatly the differential amount ΔV excesses the control target value VT). As a result, because braking torque to the wheel becomes large and so the wheel speed thereof drops, the differential amount ΔV becomes small. Thereafter, when the differential amount ΔV falls below the control target value VT and the brake-fluid pressure corresponding value BP becomes a negative value, pressure-increase of the W/C pressure is terminated.

After such an operation is executed in step 170, the driving torque control processing is once ended, and after the elapse of a predetermined time, the driving torque control processing is executed again from step 110.

As described above, the ECU 20 of the present embodiment calculates the differential amounts VFL~ΔVRR of the respective wheels FL~RR, each of which is a difference of the wheel speed relative to the wheel speed of the other wheel, by the equations (1)~(4) (at step 120 and step 140) If any of the differential amounts thus calculated becomes no less than the corresponding control target value VTFL~VTRR established at step 150 and the brake-fluid pressure corresponding value BPFL~BPRR thereof which is calculated in step 160 becomes a positive value, the wheel speed difference among the respective wheels FL~RR is made small by increasing the W/C pressure for the corresponding wheel and thereby applying braking torque thereto.

As a result, driving torque from the engine 6 and the transmission 8 is reliably transmitted to the respective wheels FL~RR through the several differential gears 10C, 10F and 10R.

Specifically, in the present embodiment, the control target values VTRL, VTRR for the rear-left and -right wheels RL, RR are set to be smaller that the control target values VTFL, VTFR for the front-left and -right wheels FL, FR. As a result, when the differential amount ΔV of the rear wheel is smaller than that of the front wheel, the pressure-increase of the W/C pressure is executed with respect to the rear wheel. Therefore, according to the present embodiment, when a wheel speed difference is generated both between the front-left wheel and the front-right wheel and between the rear-left wheel and the rear-right wheel, the wheel speed difference between the rear-left wheel and the rear-right wheel is attempted to be eliminated in preference to the wheel speed difference between the front-left wheel and the front-right wheel. As a result, priority is given to preventing the motion of the vehicle from falling in an over-steer tendency as the result that the wheel speed difference occurs between the rear-left and -right wheels RL, RR. Therefore, tractive force to move the vehicle can be enhanced while preventing a running stability of the vehicle from being deteriorated.

Figure 7:
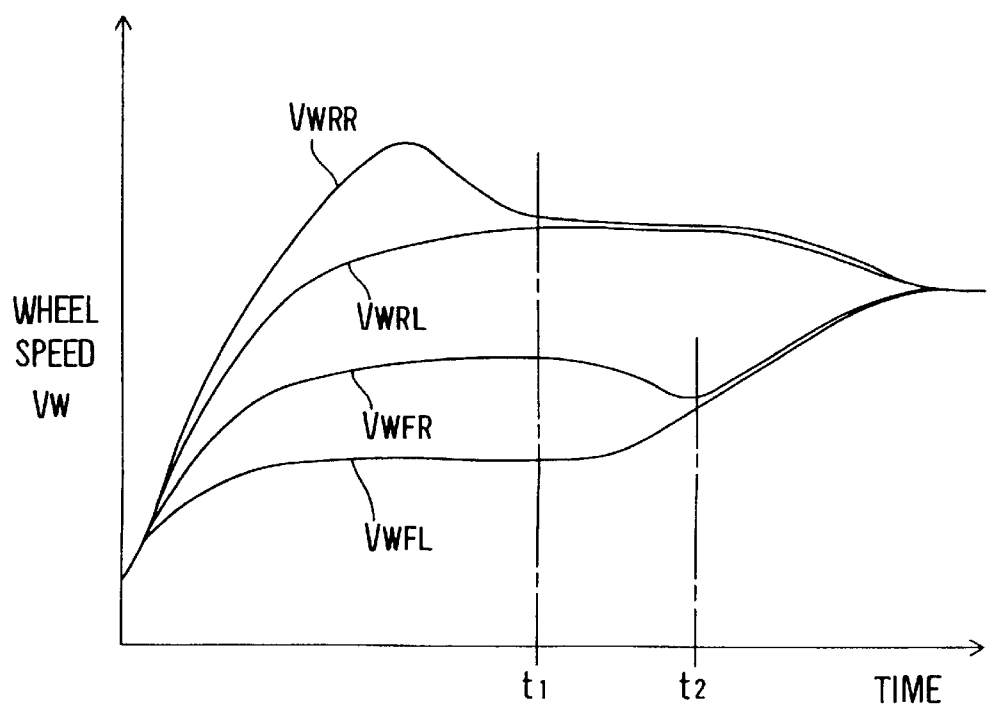
FIG. 7 is a time chart to explain the effect of driving torque control.

For example, as exemplified in FIG. 7, when the vehicle is accelerated, the wheel speed VWRR of the rear-right wheel RR is higher than the wheel speed VWRL of the rear-left wheel RL, and the wheel speed VWFR of the front-right wheel FR is higher than the wheel speed VWFL of the front-left wheel FL, a wheel speed difference between the rear-left and -right wheels RL, RR is suppressed at first (at a time t1), and then, a wheel speed difference between the front-left and -right wheels FL, FR is suppressed (at a time t2). Due to this order of priority, tractive force to move the vehicle can be enhanced while preventing a running stability of the vehicle from being deteriorated.

Also, in the present embodiment, the differential amounts ΔVFL, ΔVFR are calculated by adding each of the wheel speed differences [VWFL−VWFR], [VWFR−VWFL] between the front-left wheel and the front-right wheel to the front-rear wheel speed difference [(VWFL+VWFR)/2−(VWRL+VWRR)/2], and the differential amounts ΔVRL, ΔVRR are calculated by adding each of the wheel speed differences [VWRL−VWRR], [VWRR−VWRL] between the rear-left wheel and the rear-right wheel to the rear-front wheel speed difference [(VWRL+VWRR)/2−(VWFL+VWFR)/2).

Therefore, as a total wheel speed [VWFL+VWFR] of the front-left and -right wheels FL, FR becomes higher than a total wheel speed [VWRL+VWRR] of the rear-left and -right wheels RL, RR, the respective differential amounts ΔVFL, ΔVFR of the front-left and -right wheels FL, FR become larger. When both of the differential amounts ΔVFL, ΔVFR excess the corresponding control target value VTFL, VTFR (however, VTFL and VTFR are equal in this embodiment), braking torque is applied to both the front-left wheel FL and the front-right wheel FR, and as a result, the wheel speed difference between the front wheels and the rear wheels is suppressed.

On the contrary, as a total wheel speed [VWRL+VWRR] of the rear-left and -right wheels RL, RR becomes higher than a total wheel speed [VWFL+VWFR] of the front-left and -right wheels FL, FR, the respective differential amounts ΔVRL, ΔVRR of the rear-left and -right wheels RL, RR become larger. When both of the differential amounts ΔVRL, ΔVRR excess the corresponding control target value VTRL, VTRR (however, VTRL and VTRR are equal in this embodiment), braking torque is applied to both the rear-left wheel RL and the rear-right wheel RR, and as a result, the wheel speed difference between the front wheels and the rear wheels is suppressed.

Therefore, according to the present embodiment, because the wheel speed difference between the front wheels and the rear wheels can be suppressed as well, the tractive force to move the vehicle can be further reliably enhanced while preventing the running stability of the vehicle from being deteriorated.

It should be noted that, in the present embodiment, because the differential amounts ΔVFL~ΔVRR of the respective wheels FL~RR are calculated based on the detection signals from the wheel speed sensors 4FL~4RR, driving force to be transmitted to the respective wheels FL~RR can be accurately controlled with a simple structure. However, by monitoring differential states of the front differential gear 10F and the rear differential gear 10R, the wheel speed difference [VWFL−VWFR], [VWFR−VWFL] between the front-left wheel FL and the front-right wheel FR and the wheel speed difference [VWRL−VWRR], [VWRR−VWRL] between the rear-left wheel RL and the rear-right wheel RR may be detected. Further, by monitoring a differential state of the center differential gear 10C, the front-rear wheel speed difference [(VWFL+VWFR)/2−(VWRL+VWRR)/2] and the rear-front wheel speed difference [(VWRL+VWRR)/2−(VWFL+VWFR)/2] may be detected. The differential amounts ΔVFL~ΔVRR of the respective wheels FL~RR can be obtained based on these detected results.

In the meantime, in the present embodiment, because the driving force to be transmitted to the respective wheels FL~RR is regulated by applying braking torque to the respective wheels FL~RR, the above-described effects can be obtained by utilizing an existing brake system mounted on the vehicle. Therefore, it can be avoided to add an another apparatus on the vehicle.

In more detail, in the hydraulic circuit 40 illustrated in FIG. 2, a hydraulic circuit except for the SM valves 50a, 50b, the relief valves 54a, 54b and the SR valves 70a, 70b is normally required to perform anti-skid control. That is, the present embodiment can be structured only if the SM valves 50a, 50b, the relief valves 54a, 54b, and the SR valves 70a, 70b are added to the above-described hydraulic circuit.

The present embodiment can be modified as described below to obtain the same effects as the present embodiment.

The center differential gear 10C is formed by a differential gear of electric control type which can distribute driving torque to the front wheel drive shaft 11F and the rear wheel drive shaft 11R with a distribution ratio in accordance with the command from the ECU 20, the front differential gear 10F is formed by a differential gear of electric control type which can distribute driving torque to the front-left wheel FL and the front-right wheel FR with a distribution ratio in accordance with the command from the ECU 20, and the rear differential gear 10R is formed by a differential gear of electric control type which can distribute driving torque to the rear-left wheel RL and the rear-right wheel RR with a distribution ratio in accordance with the command from the ECU 20.

The ECU 20 calculates the differential amounts ΔVFL~ΔVRR of the respective wheels FL~RR by the following equations (9)~(12), without adding the front-rear wheel speed difference [(VWFL+VWFR)/2−(VWRL+VWRR)/2] or the rear-front wheel speed difference ((VWRL+VWRR)/2−(VWFL+VWFR)/2].

$$\Delta VFL = VWFL - VWFR \tag{9}$$

$$\Delta VFR = VWFR - VWFL \tag{10}$$

$$\Delta VRL = VWRL - VWRR \tag{11}$$

$$\Delta VRR = VWRR - VWRL \tag{12}$$

When either one of the differential amounts ΔVFL, ΔVFR of the front-left and -right wheels FL, FR excesses a predetermined value N1, the ECU 20 provides the command to the front differential gear 10F of electric control type so that the ratio of driving torque to be distributed to the wheel having the differential amount ΔV exceeding the predetermined value N1 is reduced.

In the same way, when either one of the differential amounts ΔVRL, ΔVRR of the rear-left and -right wheels RL, RR excesses a predetermined value N2, the ECU 20 provides the command to the rear differential gear 10R of electric control type so that the ratio of driving torque to be distributed to the wheel having the differential amount ΔV exceeding the predetermined value N2 is reduced.

Further, the ECU 20 calculates the front-rear wheel speed difference [(VWFL+VWFR)/2−(VWRL+VWRR)/2] and the rear-front wheel speed difference [(VWRL+VWRR)/2−(VWFL+VWFR)/2]. If the front-rear wheel speed difference [(VWFL+VWFR)/2−(VWRL+VWRR)/2] exceeds a predetermined value N3, the ECU 20 provides the command to the center differential gear 10C of electric control type so that the ratio of driving torque to be distributed to the front wheel drive shaft 11F is reduced. To the contrary, if the rear-front wheel speed difference [(VWRL+VWRR)/2−(VWFL+VWFR)/2] exceeds a predetermined value N3, the ECU 20 provides the command to the center differential gear 10C of electric control type so that the ratio of driving torque to be distributed to the rear wheel drive shaft 11R is reduced.

The above-described predetermined values N1, N2, and N3 are set so that the predetermined value N2 for the rear wheels RL, RR is smallest among them. Note that these predetermined values N1, N2, and N3 may be predetermined constant values or may be set in response to the vehicle-body speed VB as shown in the map of FIG. 6.

That is to say, in the above-described modification, the wheel speed differences between the front-left and -right wheels, between the rear-left and -right wheels, and between the front wheels and the rear wheels are separately suppressed by adjusting the distribution ratio of driving torque to be transmitted to the respective wheels FL~RR.

Because the predetermined value N2 to determine whether driving torque to be transmitted to the rear wheels RL, RR should be adjusted is set to be smallest among the predetermined values N1~N3, when the wheel speed difference occurs between the front-left and -right wheels FL, FR, between the rear-left and -right wheels RL, RR, and between the front wheels and the rear wheels, adjustment of driving torque to the rear-left and -right wheels RL, RR by the rear differential gear 10R is performed in preference to adjustment of driving torque to the front-left and -right wheels FL, FR and adjustment of driving torque to the front wheels and the rear wheels.

Therefore, in the same way as the above-described embodiment, priority is given to preventing the motion of the vehicle from falling in an over-steer tendency as the result that the wheel speed difference occurs between the rear-left and -right wheels RL, RR. As a result, tractive force to move the vehicle can be enhanced while preventing a running stability of the vehicle from being deteriorated.

Further, in the first embodiment and the modification thereof, when the differential amounts ΔVFL~ΔVRR of the respective wheels FL~RR are about to exceed PV values which represent durabilities of the respective differential gears 10C, 10F, and 10R, that is, represent working limit of a sliding bearing of each of the respective differential gears 10C, 10F, and 10F calculated as a product of bearing pressure P and sliding speed V, the engine output may be reduced by throttling the opening of a sub-throttle SS which is provided in an intake system of the engine. Due to this, the differential gears 10C, 10F, and 10C can be reliably protected.

Further, in the first embodiment, wheel speed differences between the respective wheels FL≠RR were calculated based on the detection signals from the wheel speed sensors. However, driving torque to drive the drive shafts is detected, the wheel speed differences may be calculated based on the detected driving torque.

(Second Embodiment)

Next, the second embodiment of the present invention will be described with reference to the drawings.

Figure 8:
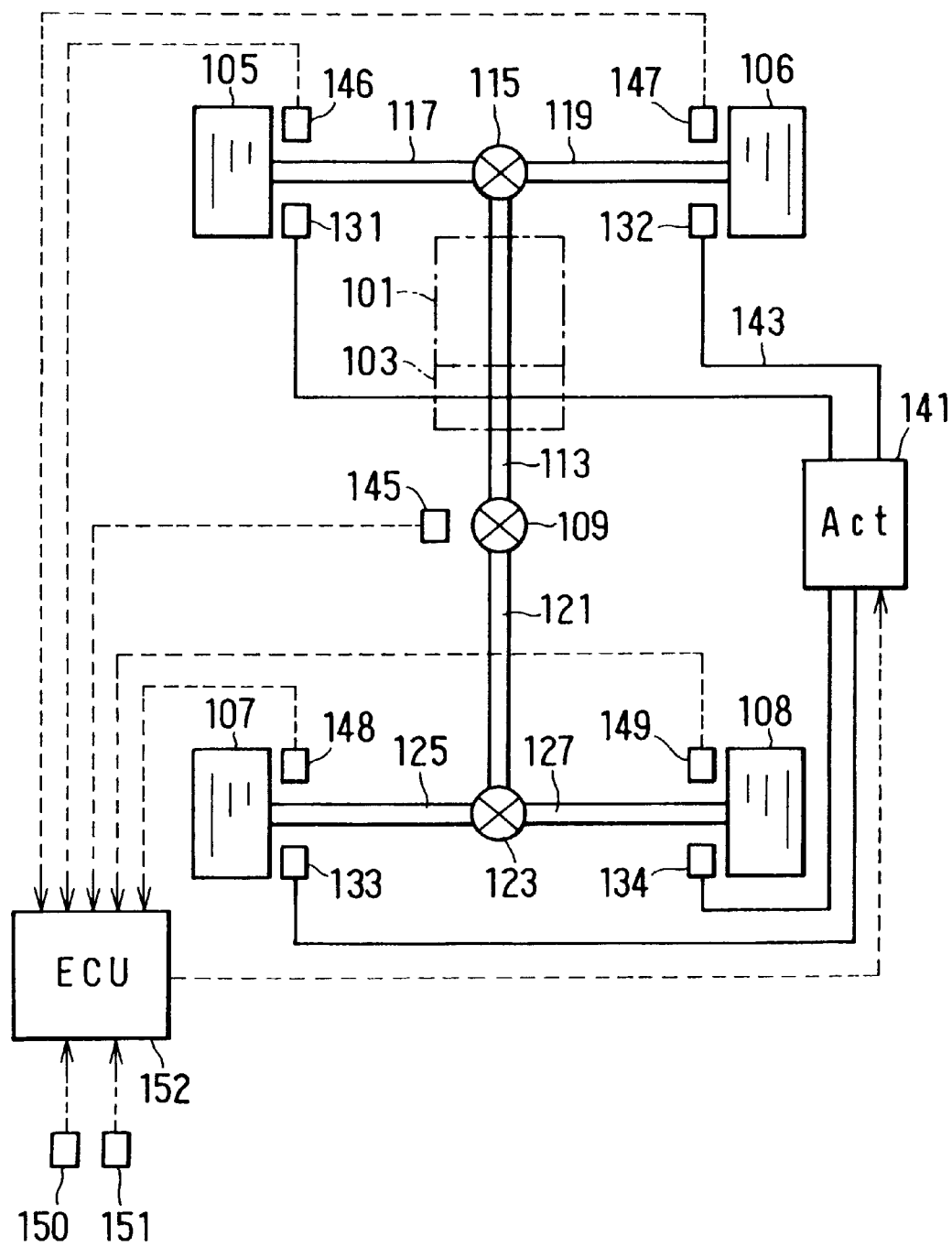
FIG. 8 is a model diagram illustrating a structure of a driving torque control apparatus according to a second embodiment of the present invention.

FIG. 8 is a model diagram illustrating a structure of a control system for a four-wheel drive vehicle according to a second embodiment of the present invention.

In FIG. 8, driving torque generated from an engine 101 is fed, through a transmission 103, to a center differential gear 109 which equally distributes the driving torque to front wheels 105, 106 side and rear wheel 107, 108 side.

A front wheel drive shaft 113 connected to the center differential gear 109 is connected to a front differential gear 115 at another end thereof so that driving torque is transmitted to the front-left and -right wheels 105, 106 through left and right front axle shafts 117, 119. A rear wheel drive shaft 121 connected to the center differential gear 109 is connected to a rear differential gear 123 at another end thereof so that driving torque is transmitted to the rear-left and -right wheels 107 and 108 through left and right rear axle shafts 125, 127.

Brake devices 131, 132, 133, and 134 including wheel cylinders (not illustrated) are provide to the wheel 105~108, respectively. The brake devices 131~134 can independently control braking torque provided to each of the respective wheels 105~108 by adjusting braking pressure (wheel cylinder pressure) supplied to each of the wheel cylinders.

The brake devices 131~134 are connected to a brake actuator 141 adjusting the braking pressure via a hydraulic pressure conduit 143. The brake actuator 141 is for increasing or reducing brake fluid pressure to execute well-known anti-skid control or traction control and includes solenoid valves, pumps and the like which are activated in response to control signals.

Further, in the second embodiment, there are provided as sensors to detect a vehicle running state, a linear longitudinal acceleration sensor 145 which detects acceleration in a longitudinal direction of the vehicle, wheel speed sensors 146, 147, 148, and 149 which detect rotational speeds of the respective wheels 105~108, a stop switch 150 which detects that a brake pedal (not illustrated) is depressed, and an idle switch 151 which detects that an accelerator pedal and in turn a throttle valve (not illustrated) are returned to a closed position.

Detection signals from the linear longitudinal acceleration sensor 145, wheel speed sensors 146~149, stop switch 150, and idle switch 151 are fed to an electric control unit (ECU) 152. The ECU 152 provides control signals to, for example, the brake actuator 141 to adjust brake fluid pressure by activating the solenoid valves and the like.

Next, among controls executed by the ECU, differential restraining control and four wheel spinning state control (hereinafter, the both control is termed as "EDC control") with reference to FIG. 9 to FIG. 13.

Differential restraining control is for restraining wheel speed differences among the respective wheels by applying braking torque to spinning wheels when all of the four wheels do not fall in a spinning state (for example, only one of the four wheels is spinning). Four wheel spinning state control is for enhancing force with which the rear wheels 107, 108 grip road surface by applying braking torque to the rear wheels 107, 108 when all of the four wheels fall in the spinning state.

An entire processing of EDC control is described with reference to the flow chart illustrated in FIG. 9. Note that this processing is executed at every predetermined time period (for example, 6 ms) by a timer interrupted action.

Figure 9:
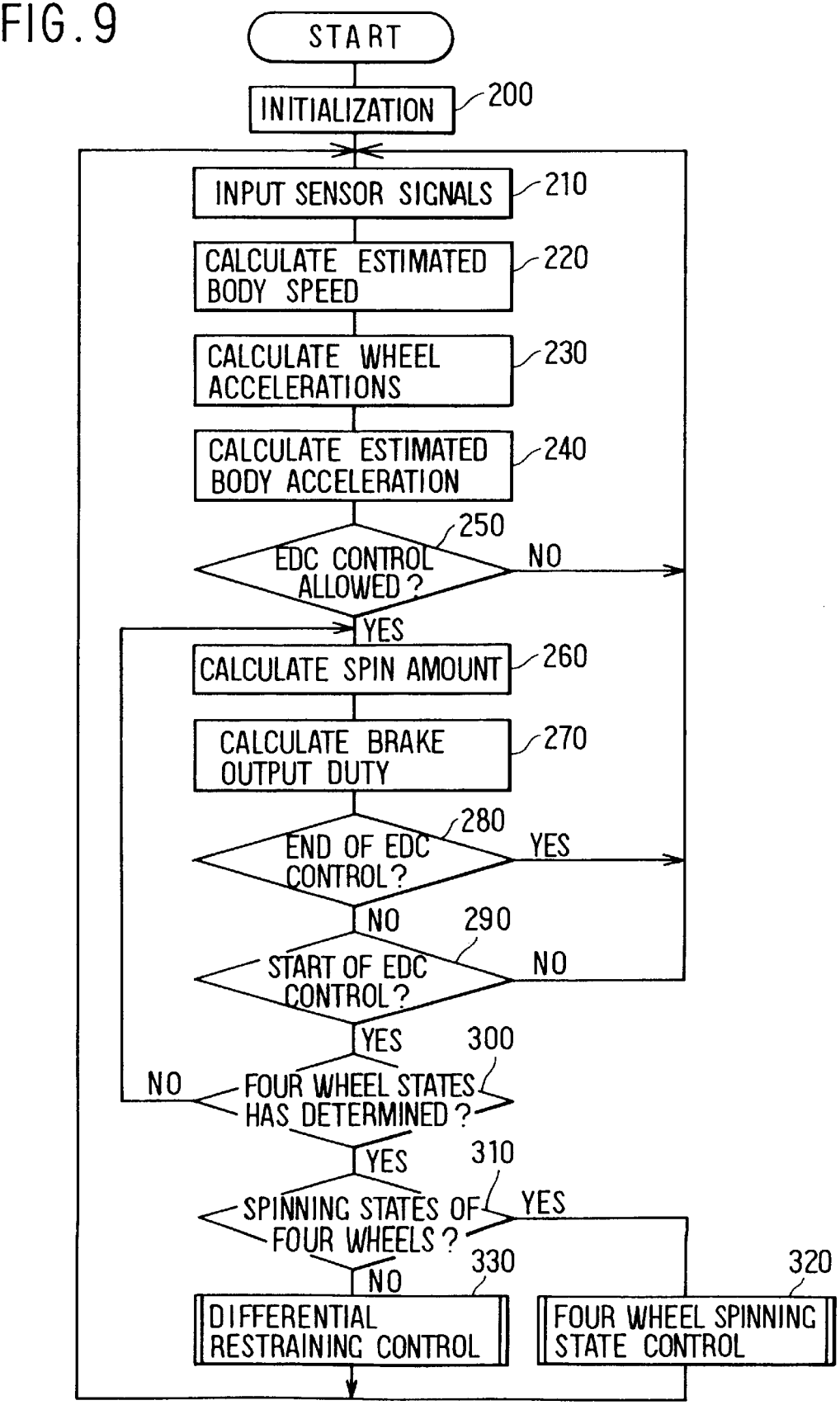
FIG. 9 is a main flow chart illustrating a control processing of the second embodiment.

At step 200 in FIG. 9, a well-known initialization operation is performed. In this initialization operation, flags such as a four wheel spinning flag F4W and the like are reset.

At subsequent step 210, detection signals from the wheel speed sensors 146~149 and the linear longitudinal acceleration sensor 145 are read in.

At subsequent step 220, an estimated vehicle body speed VB is calculated. Calculation method of the estimated vehicle body speed VB is different between a case in which all of the four wheels are in the spinning state (hereinafter, termed as "four wheel spinning state") and a case in which all of the four wheels are not in the spinning state (hereinafter, termed as "certain wheel spinning state"). That is to say, during the four wheel spinning state, the estimated vehicle body speed VB is calculated by integrating vehicle-body acceleration dVB detected by the linear acceleration sensor 145. On the other hand, during the certain wheel spinning state, the estimated vehicle body speed VB is determined based on the minimum speed among the wheel speeds Vw in the same way as the first embodiment. Note that whether or not the present state is the four wheel spinning state is determined based on the four wheel spinning flag F4W, and a setting method for this four wheel spinning flag F4W will be described later.

At subsequent step 230, an acceleration of the wheel (hereinafter, termed as "minimum speed wheel") having the minimum wheel speed among the respective wheels is calculated to establish the acceleration of the minimum speed wheel as a wheel acceleration dVwmin.

Next, at step 240, an estimated vehicle body acceleration dVB is calculated based on the signals from the linear acceleration sensor 145.

At subsequent step 250, it is determined whether performance of EDC control is allowed. That is, it is determined whether a condition for starting EDC control is fulfilled. When the determination made herein is affirmative (YES), the processing advances to step 260, on the other hand, when the determination is negative (NO), the processing returns to step 210. It is to be noted that, for example, when the stop switch 150 is turned off (i.e., the brake pedal is not depressed), EDC control is allowed to start. Further, as the condition for starting EDC control, an off state of the idle switch 151 (i.e., the accelerator pedal is being depressed) or wheel cylinder pressure no more than a predetermined value can be adopted.

At step 260, spinning amounts BP of the respective wheels are calculated by using the following equation (13)

$$BP = Ka(Vw - VB - VTRC) + Kb \times dVw \quad (13)$$

wherein Ka is a speed coefficient, Kb is an acceleration coefficient, Vw respesents the wheel speed of each of the wheels, VB is the estimated vehicle body speed, VTRC is a taget spin amount (which is a value corresponding to a peak road-surface friction coefficient ($\mu$)), and dVw represents the wheel acceleration of each of the wheels.

Figure 10:
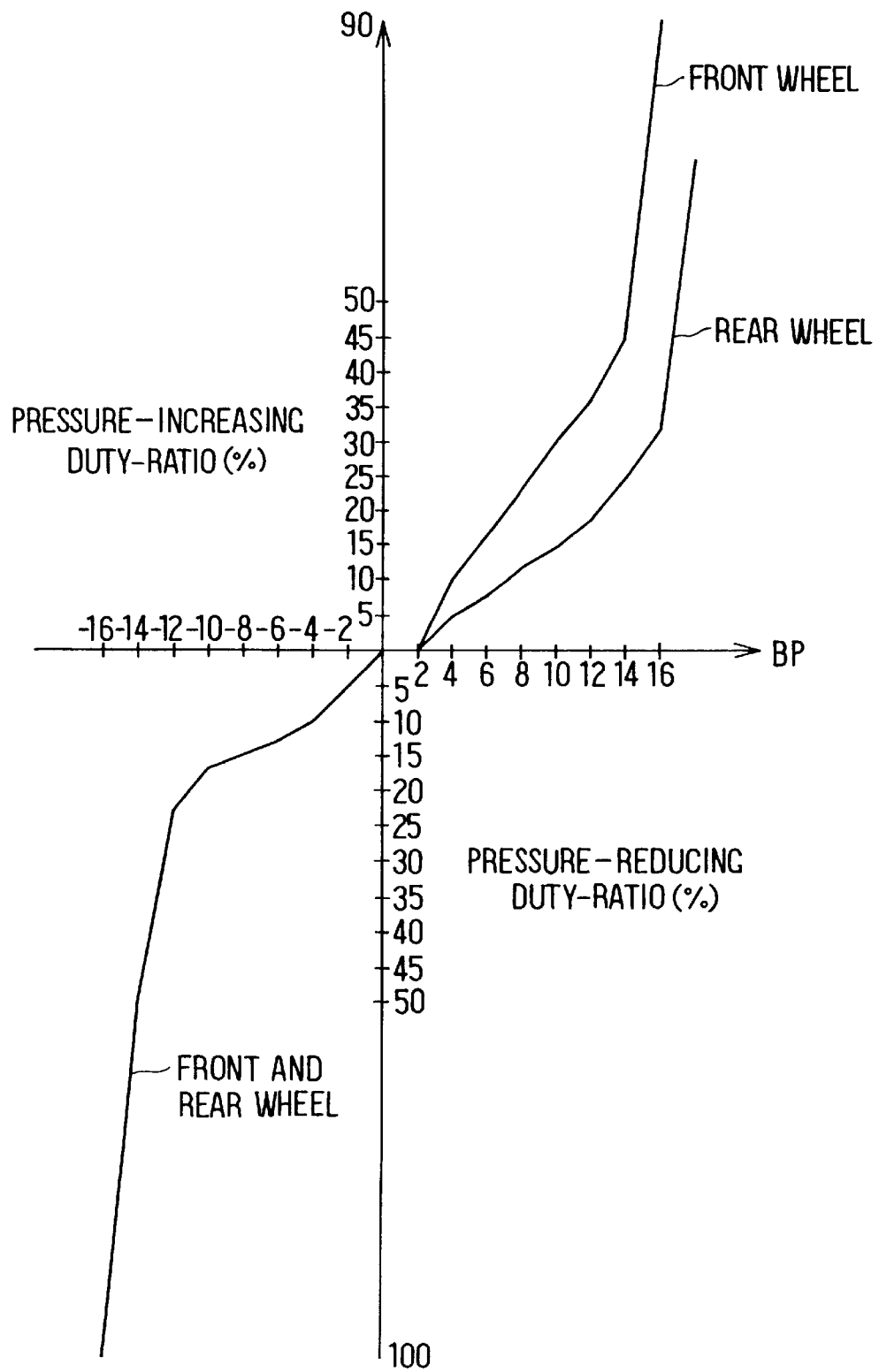
FIG. 10 is a graph illustrating duty ratios with which pressure-increasing and pressure-reducing valves provided for each of front and rear wheels is driven.

At subsequent step 270, brake output duty signals are calculated. The brake output duty signals are derived from a map as illustrated in FIG. 10 and include duty ratios to control the solenoid valves in the brake actuator 141 alternately between a pressure-increasing state and a pressure-holding state or alternately between a pressure-reducing state and the pressure-holding state on a basis of the spinning amounts BP of the respective wheels. By adding a brake-fluid pressure control cycle (for example, 50 ms) to the duty ratio, duty time during which the pressure-increasing state or the pressure-reducing state is maintained can be calculated.

At subsequent step 280, it is determined whether conditions for terminating EDC control are fulfilled. This determination is made with respect to the respective wheels. When the determination made herein is affirmative, the processing returns to step 210, on the other hand, when the determination is negative, the processing advances to step 290. In more detail, when a degree of wheel spin is small, for example, in a case of the spinning amount BP no more than a predetermined value (>KBPEND, in a case of an estimated brake-fluid pressure (wheel cylinder pressure) being zero, or during deceleration of the wheel, it is determined that the conditions for terminating EDC control are fulfilled.

At step 290, it is determined to each of the wheels whether conditions for starting EDC control are fulfilled. When the determination made herein is affirmative, the processing advances to step 300, on the other hand, when the determination is negative, the processing returns to step 210. In more detail, when the degree of wheel spin is large, for example, in a case of the spinning amount BP no less than a predetermined value KBPST (>KBPEND) and during acceleration of the wheel, it is determined that the conditions for starting EDC control are fulfilled.

At step 300, it is determined whether the determinations for terminating and starting EDC control have been made with respect to all of the four wheels. When the determination is affirmative, the processing advances to step 310, on the other hand, when the determination is negative, the processing returns to step 260.

At step 310, whether all of the four wheels are in a spinning state (four wheel spinning state) is determined by whether or not the four wheel spinning flag F4W has been set (to 1). When the determination made herein is affirmative, the processing advances to step 320, on the other hand, when the determination is negative, the processing advances to step 330. Note that the detailed determining method in step 310 will be described later.

At step 320, because the four wheels are in the spinning state, four wheel spinning state control which is described later is executed, and then the processing returns to step 210.

At step 330, on the other hand, because the four wheels are not in the spinning state but certain wheel(s) is in the spinning state, differential restraining control which is described later is executed, and then the processing returns to step 210.

Next, the processing for setting the four wheel spinning flag F4W which is used for the processing to determine the four wheel spinning state, that is, the determination of the four wheel spinning state at step 310 is described with reference to FIG. 11. The flow chart in FIG. 11 is performed at every predetermined time interval (48 ms) by a timer interruption action.

Figure 11:
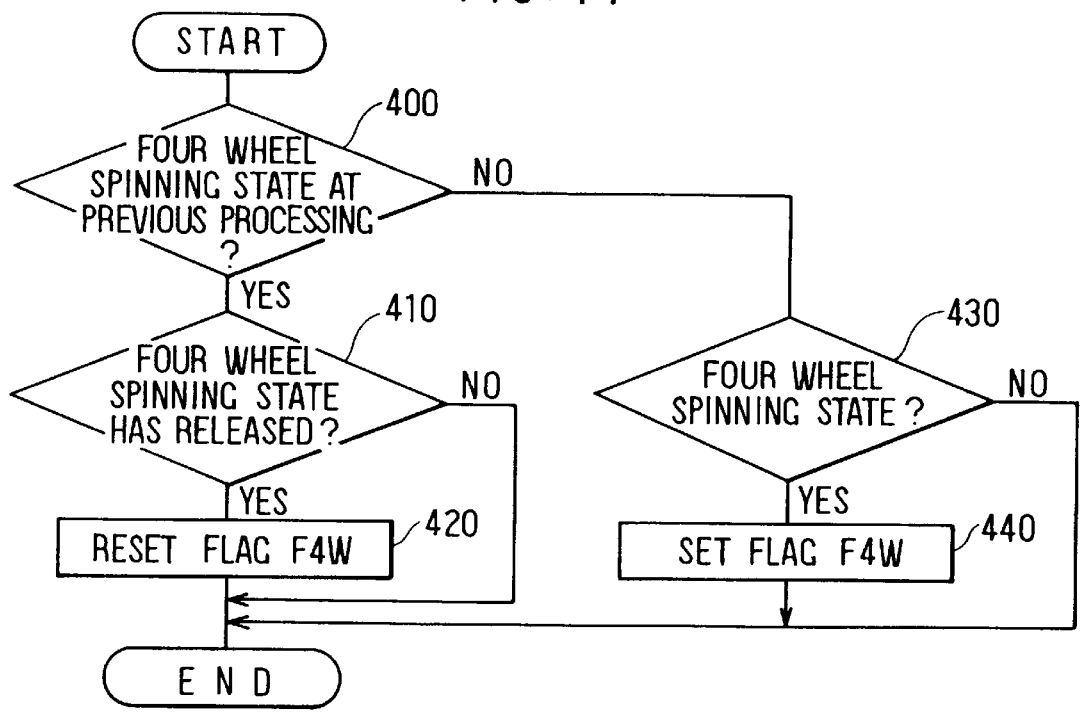
FIG. 11 is a flow chart illustrating a processing to set a flag F4W which represents that all of four wheels are spinning.

At step 400 in FIG. 11, whether the fulfillment of the four wheel spinning state has been determined at the previous processing of the flow chart illustrated in FIG. 11 is determined by whether or not the four wheel spinning flag F4W has been set. When the determination is affirmative, the processing advances to step 410 to execute the determination of whether the four wheel spinning state has been released, on the other hand, when the determination is negative, the processing advances to step 430 to execute the determination of whether the four wheel spinning state has established.

At step 410, it is determined whether the conditions to release the four wheel spinning state is fulfilled. When the determination made herein is affirmative, the processing advances to step 420, on the other hand, when the determination is negative, the processing is once ended.

In more detail, when the following conditions (A) and (B) are fulfilled at the same time, it is determined that the four wheels are not in the spinning state, and then the four wheel spinning flag F4W is reset.

(A): When the four wheel spinning state is continuously maintained for 500 ms or more ( to prevent hunting of control).

(B): When any state of the following (1) to (3) is successively detected twice.

(1) Wheel speeds Vw of the front-left and -right wheels are equal to or lower than the estimated vehicle-body speed VB.

(2) The linear longitudinal acceleration sensor 145 detects a state of deceleration.

(3) The estimated vehicle-body speed is zero.

At step 420, the four wheel spinning flag F4W is reset, and then the processing is once ended.

At step 430 to which the processing advances as the result that it is determined that the four wheel spinning flag F4W has not been set, it is determined whether the conditions for setting the four wheel spinning flag F4W are fulfilled. When the determination made herein is affirmative, the processing advances to step 440, on the other hand, when the determination is negative, the processing is once ended.

In more detail, in a case where all of states described in the following conditions (C), (D), and (E) simultaneously occur, it is determined the four wheels fall in the spinning state, and the four wheel spinning flag F4W is set to 1.

(C) The linear longitudinal acceleration sensor 145 detects a state of acceleration.

(D) The estimated vehicle-body speed VB is more than zero, thereby exhibiting a running state of the vehicle.

(E) Either one of the following conditions (1) and (2) is satisfied.

(1) The rear-left and -right wheels are subject to differential restraining control.

(2) The wheel acceleration dvwmin is greater by 0.2 G than the vehicle acceleration dVB. (Herein, the wheel acceleration dVwmin is acceleration of the wheel having the minimum wheel speed, that is, the minimum speed wheel.)

The four wheel spinning flag F4W representing the four wheel spinning state is set as described above, and differential restraining control and four wheel spinning state control are switched based on the four wheel spinning flag F4W.

Next, the operation of the control system for the four-wheel drive vehicle will be described.

First, description is given to differential restraining control which is performed at step 330.

In differential restraining control, the wheel speed of each of the wheels is controlled to a speed which has a certain spin ratio (S=(Vw−VB)/VB) relative to the estimated vehicle-body speed VB (that is, the wheel speed Vw of the minimum speed wheel). When the spin ratio serving as a target value is changed, the same operation as a mechanical limited-slip differential gear can be obtained.

Figure 12:
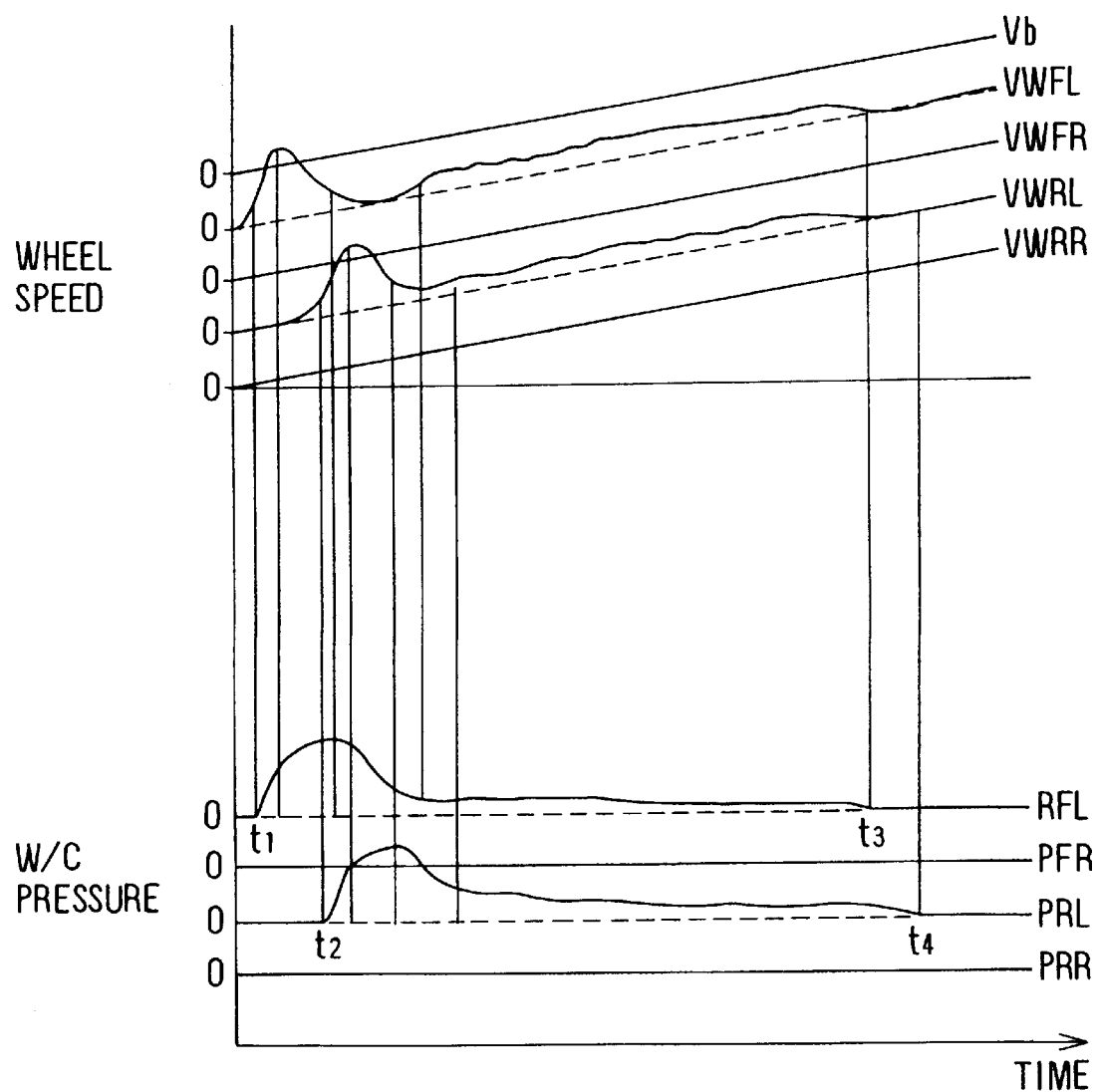
FIG. 12 is a time chart illustrating differential restraining control.

Differential restraining control is described in more detail with reference to FIG. 12.

For example, when the vehicle runs on a road at which the left wheel side of the vehicle has lower friction coefficient than the right wheel side thereof, the wheel speeds Vw of the front-left and rear-left wheels on the lower friction coefficient side are increased. In that case, by increasing wheel cylinder pressures (W/C brake-fluid pressures) PFL, PRL of the corresponding wheels and thereby applying braking torque thereto, the wheel speeds VwFL, VwRL on the lower friction coefficient side are reduced, whereby the left and right wheel speeds are close to the same speed.

Therefore, even when the differential gear is provided, because the spinning state is lowered with respect to one of the left and right wheels, the control system of the present embodiment exhibits the same function as the mechanical limited-slip differential gear, and sufficient driving torque can be transmitted to the left and right wheels.

Next, four wheel spinning state control which is performed in step 320 will be described.

When all of the four wheels fall in the spinning state, both the front and rear wheels lose their grips, thereby exhibiting very small lateral resistant force. Therefore, even when the vehicle runs straight, running straight becomes difficult due to a little disturbance. Moreover, when the vehicle is in a turning state, the stability of the vehicle is deteriorated, and for example the vehicle may spin from an over-steer state.

In the present embodiment, according to four wheel spinning state control, the spinning states of the rear wheels are lowered by applying braking torque thereto. As a result, because the lateral resistant forces of the rear wheels are increased as the result that the grips of the rear wheels on the road are enhanced, the running stability of the vehicle is improved. Further, during the turning state of the vehicle, a moment in a direction opposite to a direction in which the vehicle spins is generated, thereby avoiding the spin of the vehicle. Moreover, excessive driving torque is transferred to the front wheels due to the action of the differential gears. As a result, the spinning states of the front wheels are intensified to ensuring the stability of the vehicle. Further, driving torque generated by the engine may be reduced by performing fuel-cut operation and thereby caution can be given to the driver.

This four wheel spinning state control is described in more detail with reference to the time chart in FIG. 13.

Figure 13:
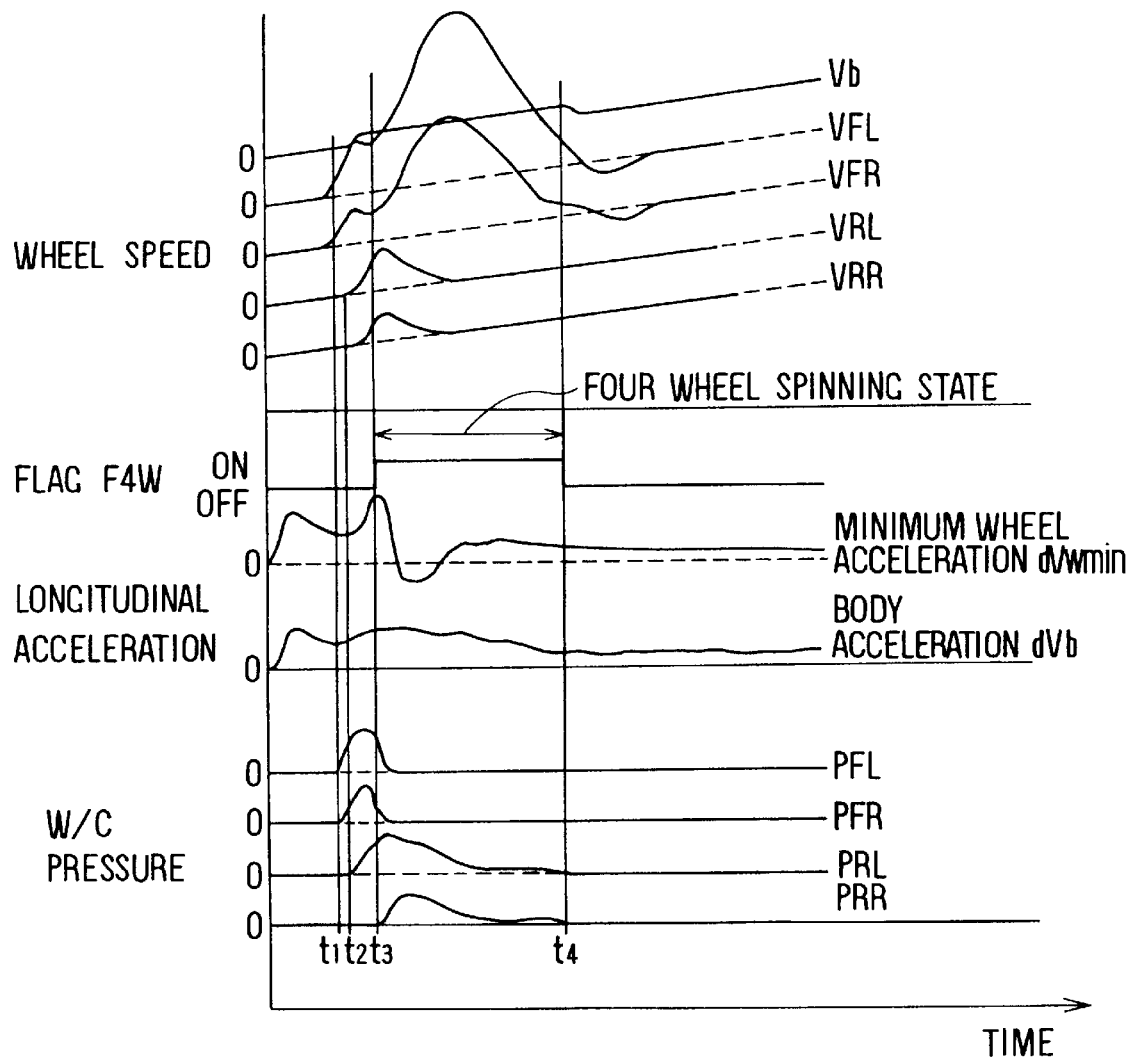
FIG. 13 is a time chart illustrating four wheel spinning specified control.

For example, in a case illustrated in FIG. 13 the front-left and -right wheels are in the spinning state from a time t1 to a time t3. Therefore, differential restraining control is executed at that duration to increase wheel cylinder pressures PFL, PFR of the front-left and -right wheels.

Next, at a time t3 when the wheel acceleration dVwmin of the minimum speed wheel is greater by a predetermined value than the vehicle-body acceleration dVB, it is determined as the four wheel spinning state. Therefore, four wheel spinning state control which increases the wheel cylinder pressures PRL, PRR of the rear-left and -right wheels is executed during a time period from the time t3 to a time t4. As a result, there are obtained effects such that the running stability of the vehicle is improved and the spin of the vehicle is prevented.

When the wheel speeds of the front wheels are increased so that the spin ratios thereof exceed a predetermined value (at the time t1), the wheel cylinder pressures of the front-left and -right wheels are increased due to differential restraining control. However, differential restraining control is forcibly terminated at the time t3 when four wheel spinning state control is started. That is to say, from the time t3 to t4, braking torque is applied only to the rear-left and -right wheels due to four wheel spinning state control. It is to be noted that, in FIG. 13, the wheel cylinder pressure PRL of the rear-left wheel is increased prior to the time t3. This is because the spin ratio of the rear-left wheel becomes large and differential restraining control is started from a time t2.

Although the preferred second embodiment of the present invention was described, the present invention is not limited to this. That is, the present invention can be modified in various ways without departing from the spirit and the scope of the invention as hereinafter claimed.

For example, when four wheel spinning state control is executed, the grips of the drive wheels can be recovered by performing fuel-cut operation and reducing the engine output.

As vehicle-body motion control other than that described in the second embodiment, there is control to prevent the wheel speeds of the rear wheels from dropping during deceleration of the vehicle.

Figure 14:
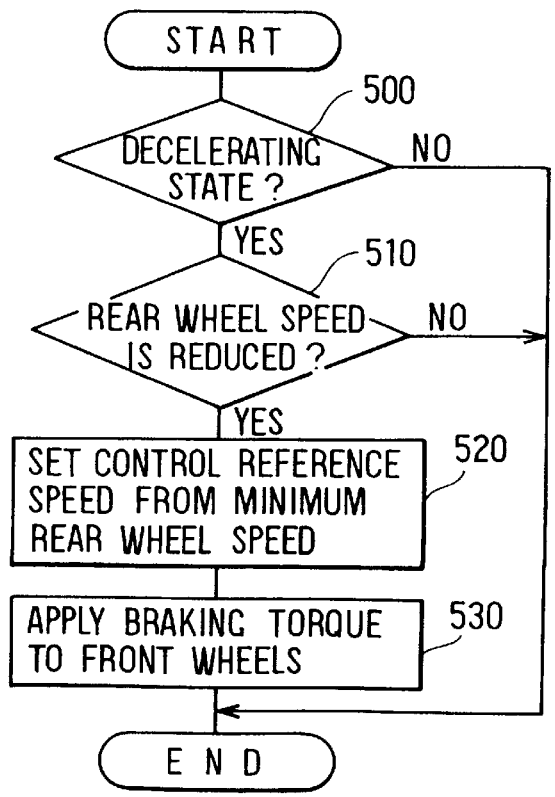
FIG. 14 is a flow chart illustrating driving torque control in a third embodiment.

For example, as shown in the flow chart of FIG. 14, at step 500, it is determined based on the estimated vehicle-body speed VB whether the vehicle is in a deceleration state. When the determination is affirmative, the processing advances to step 510, on the other hand, when the determination is negative, the processing is once ended.

At step 510, it determined whether the wheel speeds of the rear wheels has greatly dropped by comparing the estimated vehicle-body speed and the rear wheel speeds. When the determination is affirmative, the processing advances to step 520, on the other hand, when the determination is negative, the processing is once ended.

At step 520, a control reference speed is set from a minimum speed between the wheel speeds of the rear wheels. Note that the control reference speed can be set from an average speed of the rear wheel speeds.

At step 530, braking torque is applied to the front wheels based on the difference between the control difference speed and the front wheel speeds to reduce the front wheel speeds. That is, in this example, by applying braking torque only to the front wheels, driving torque applied to the front wheels is transferred to the rear wheels, thereby recovering the rear wheel speeds which begin to drop. As a result, the running stability of the vehicle can be improved.

Additionally, in the first embodiment, only differential restraining control is performed. However, four wheel spinning state control described in the second embodiment may be performed in addition to differential restraining control in the first embodiment. That is, for example, when the four wheels fall in the spinning state despite differential restraining control of the first embodiment is performed, four wheel spinning state control may be executed in place of differential restraining control.

What is claimed is:

1. A driving torque control method for a four-wheel drive vehicle comprising the steps of:

performing first differential restraining control for restraining a rotational speed differential between front-left and front-right wheels by adjusting driving torque to be transmitted from a power source mounted on a four-wheel drive vehicle to each of said front-left and front-right wheels; and performing second differential restraining control for restraining a rotational speed differential between rear-left and rear-right wheels by adjusting driving torque to be transmitted from said power source to each of said rear-left and rear-right wheels, wherein an adjustment of said driving torque to be transmitted to said rear-left and rear-right wheels by said second differential restraining control is executed with higher priority to an adjustment of said driving torque to be transmitted to said front-left and front-right wheels by said first differential restraining control, wherein the rotational speed differential between said front-left and front-right wheels is calculated as a function of a difference between rotational speeds of said front-left and front-right wheels, wherein the rotational speed differential between said rear-left and rear-right wheels is calculated as a function of a difference between rotational speeds of said rear-left and rear-right wheels, and wherein said adjustment of either of said driving torques depends upon the rotational speed differential between the left and right wheels.

2. A driving torque control method for a four-wheel drive vehicle according to claim 1, further comprising a step of:

performing third differential restraining control for restraining a speed differential between an average rotational speed of said front-left and front-right wheels and an average rotational speed of said rear-left and rear-right wheels by adjusting driving torque transmitted to each of the front-left, front right, rear-left and rear-right wheels, wherein said adjustment of driving torque by second differential restraining control is executed in preference to said adjustment of driving torque by first differential restraining control and an adjustment of driving torque by third differential restraining control.

3. A driving torque control method according to claim 1, wherein:

each of the rotational speed differentials is calculated further as a function of a difference between an average rotational speed of said front-left and front-right wheels and an average rotational speed of said rear-left and rear-right wheels.

4. A driving torque control apparatus for a four-wheel drive vehicle comprising:

a first differential restraining device which restrains a rotational speed differential between front-left and front-right wheels by adjusting driving torque to be transmitted from a power source mounted on a four-wheel drive vehicle to each of said front-left and front-right wheels;

a first adjusting device which adjusts driving torque to be transmitted from said power source to said front-left and front-right wheels in response to a given command;

a first differential amount detecting device which detects a rotational speed differential to a wheel speed of an opposing wheel with respect to each of said front-left and front-right wheels and generates said rotational speed differential as a differential amount of each of said front-left and front-right wheels;

a first control device which feeds said command to said first adjusting device, when said rotational speed differential is no less than a first predetermined value, in order to reduce driving torque to be transmitted to a wheel having said rotational speed differential no less than said first predetermined value;

a second differential restraining device which restrains a rotational speed differential between rear-left and rear-right wheels by adjusting driving torque to be transmitted from said power source to each of said rear-left and rear-right wheels;

a second adjusting device which adjusts driving torque to be transmitted from said power source to said rear-left and rear-right wheels in response to a given command;

a second differential amount detecting device which detects a rotational speed differential to a wheel speed of an opposing wheel with respect to each other of said rear-left and rear-right wheels and generates said rotational speed differential as a differential amount of each of said rear-left and rear-right wheels; and a second control device which feeds said command to said first adjusting device, when said rotational speed differential is no less than a second predetermined value, in order to reduce driving torque to be transmitted to a wheel having said rotational speed differential no less than said second predetermined value, said second predetermined value being set to be higher than said first predetermined value, wherein said second differential restraining device adjusts driving torque to be transmitted to said rear-left and rear-right wheels with higher priority to an adjustment of driving torque to be transmitted to said front-left and front-right wheels by said first differential restraining device, and wherein either of said first and second differential restraining devices adjust said driving torque depending upon the rotational speed differential between the left and right wheels.

5. A driving torque control apparatus for a four-wheel drive vehicle according to claim 4, further comprising:

a third differential amount detecting device, wherein said third differential amount detecting device detects, as a front-rear wheel speed difference, a speed differential between an average rotational speed of said front-left and front-right wheels and an average rotational speed of said rear-left and rear-right wheels and generates, as said differential amount of each of said front-left and front-right wheels, values obtained by adding said front-rear wheel speed difference to said rotational speed differential to said wheel speed of said opposing wheel with respect to each of said front-left and front-right wheels, and said third differential amount detecting device detects, as a rear-front wheel speed difference, a speed differential between an average rotational speed of said rear-left and rear-right wheels and an average rotational speed of said front-left and front-right wheels and generates, as said differential amount of each of said rear-left and rear-right wheels, values obtained by adding said rear-front wheel speed difference to said rotational speed differential to said wheel speed of said opposing wheel with respect to each of said rear-left and rear-right wheels.

6. A driving torque control apparatus for a four-wheel drive vehicle according to claim 4, further comprising:

wheel speed sensors to detect rotational speed of each of said four wheels, wherein said first and second differential amount detecting devices generate said differential amounts corresponding to each of said four wheels based on detection signals from said wheel speed sensors.

7. A driving torque control apparatus for a four-wheel drive vehicle according to claim 4, wherein said first adjusting device adjusts driving torque to be transmitted from said power source to said front-left and front-right wheels by applying braking torque to each of said front-left and front-right wheels in response to said given command, and said second adjusting device adjusts driving torque to be transmitted from said power source to said rear-left and rear-right wheels by applying braking torque to each of said rear-left and rear-right wheels in response to said given command.

8. A driving torque control apparatus for a four-wheel drive vehicle according to claim 4, further comprising:

a third differential restraining device which restrains a speed differential between an average rotational speed of said front-left and front-right wheels and an average rotational speed of said rear-left and rear-right wheels by adjusting driving torque transmitted to each of the front-left, front right, rear-left and rear-right wheels, wherein said second differential restraining device adjusts driving torque to be transmitted to said rear-left and rear-right wheels in preference to said adjustment of driving torque to be transmitted to said front-left and front-right wheels by said first differential restraining device and an adjustment of driving torque to be transmitted to said front-left and front-right wheels and said rear-left and rear-right wheels by said third differential restraining device.

9. A driving torque control apparatus for a four-wheel drive vehicle according to claim 4, wherein said first differential restraining device includes a first wheel cylinder imparting braking torque to said front-left wheel and a second wheel cylinder imparting braking torque to said front-right wheel, and said second differential restraining device includes a third wheel cylinder imparting braking torque to said rear-left wheel and a fourth wheel cylinder imparting braking torque to said rear-right wheel.

10. A driving torque control apparatus for a four-wheel drive vehicle according to claim 4, wherein said adjustment of driving torque by said first differential restraining device is prohibited and only an adjustment of driving torque by said second differential restraining device is executed when all of said four wheels fall in a spinning state more than a predetermined spinning state.

11. A driving torque control apparatus for a four-wheel drive vehicle according to claim 9, wherein brake-fluid pressure is applied only to said third and fourth wheel cylinders and said rotational speed differential between front-left and front-right wheels is allowed to leave as it is when all of said four wheels fall in a spinning state more than a predetermined spinning state.

* * * * *